(12) United States Patent
Bapst

(10) Patent No.: US 6,367,875 B1
(45) Date of Patent: Apr. 9, 2002

(54) STAY IN VIEW CAR SEAT

(75) Inventor: David M. Bapst, South Wales, NY (US)

(73) Assignee: Mattel, Inc., Segundo, CA (US)

( * ) Notice: Subject to any disclaimer, the term of this patent is extended or adjusted under 35 U.S.C. 154(b) by 0 days.

(21) Appl. No.: 09/422,067

(22) Filed: Oct. 21, 1999

(51) Int. Cl.⁷ .............................. B60N 2/28; A47D 1/10
(52) U.S. Cl. .............................. 297/250.1; 297/256.16; 297/183.1; 297/183.2; 297/185; 297/130; 297/217.6; 359/871
(58) Field of Search ......................... 247/250.1, 256.16, 247/217.6, 183.1, 183.2, 185, 130; 359/871; 224/614, 257

(56) References Cited

U.S. PATENT DOCUMENTS

| | | |
|---|---|---|
| 231,048 A | 8/1880 | Ives |
| 576,292 A | 2/1897 | Vanderburgh |
| 755,554 A | 3/1904 | Turnbull |
| 982,376 A | 1/1911 | Macfarlane |
| D143,283 S | 12/1945 | De Pirro ........................ D58/4 |
| 2,554,340 A | 5/1951 | Maxwell ........................ 224/6 |
| 2,628,358 A | 2/1953 | Neils |
| 2,689,672 A | 9/1954 | Thompson ..................... 224/6 |
| 2,804,249 A | 8/1957 | Manalo .......................... 224/6 |
| 2,846,699 A | 8/1958 | Watson |
| 3,587,952 A | 6/1971 | Higuchi .......................... 224/6 |
| 3,841,543 A | 10/1974 | Bolton ............................ 224/6 |
| 4,324,430 A | 4/1982 | Dimas, Jr. et al. ..... 297/250.1 X |
| 4,359,266 A | 11/1982 | Rohlf et al. |
| 4,487,346 A | 12/1984 | Fischer, Jr. ................. 224/160 |
| 4,510,634 A | 4/1985 | Diedrich et al. |
| 4,516,806 A | 5/1985 | McDonald et al. .... 299/183.28 |
| 4,544,088 A | 10/1985 | Reding ......................... 224/159 |
| 4,634,175 A | 1/1987 | Wise ........................ 297/183.1 |
| 4,634,177 A | * 1/1987 | Meeker ................ 297/183.2 X |
| 4,702,572 A | 10/1987 | Cossey .......................... 350/639 |
| 4,703,972 A | * 11/1987 | Omberg ............. 297/188.06 X |
| 4,712,892 A | 12/1987 | Masucci ...................... 359/871 |
| 4,902,118 A | 2/1990 | Harris .......................... 399/871 |
| 4,909,618 A | 3/1990 | Gardner ..................... 350/623 |
| 4,911,499 A | * 3/1990 | Meeker .................. 297/130 X |
| 5,011,057 A | 4/1991 | Perruzza et al. ............. 224/158 |
| 5,052,750 A | * 10/1991 | Takahashi et al. .. 297/256.16 X |
| 5,243,724 A | 9/1993 | Barnes .......................... 5/482 |
| 5,267,680 A | 12/1993 | Torok .................. 297/183.1 X |
| 5,277,472 A | * 1/1994 | Freese et al. ........ 297/183.2 X |
| 5,285,321 A | 2/1994 | Nolan-Brown .......... 359/871 X |
| 5,385,387 A | 1/1995 | Kain ..................... 297/256.16 |

(List continued on next page.)

FOREIGN PATENT DOCUMENTS

| | | |
|---|---|---|
| GB | 428 | 2/1859 |
| DE | DD-144-648 | 10/1980 |
| DE | 4015-606 A | 11/1991 |
| JP | 6-237805 | 8/1994 |

Primary Examiner—Peter M. Cuomo
Assistant Examiner—Rodney B. White
(74) Attorney, Agent, or Firm—Morgan Lewis & Bockius

(57) ABSTRACT

An infant carrier is shown that can be used as a rearwardly facing infant car seat either by itself or attached to a separate base support, as a stroller seat, or as a carrier for an infant with an adjustable handle attached between longitudinally opposed ends of the carrier. The separate base support can be belted into a vehicle seat and left in place after the infant carrier is removed. The base support has a vertical portion that rests parallel to the back seat of the vehicle and includes a mirror mounted high enough on the back portion to be visible from the vehicle's rear view mirror when the infant carrier is mounted in the base support. The infant carrier has a handle that can be reciprocated in the axial direction of the carrier to actuate two separate attachment mechanisms for attaching the infant carrier to the base support or to a stroller.

28 Claims, 22 Drawing Sheets

U.S. PATENT DOCUMENTS

| | | |
|---|---|---|
| 5,409,292 A | 4/1995 | Kain et al. .............. 297/183.1 |
| 5,540,695 A | 7/1996 | LaMair .............. 297/256.16 X |
| 5,567,008 A * | 10/1996 | Cone, II .............. 297/183.2 X |
| 5,573,156 A | 11/1996 | McConnell ................ 224/158 |
| 5,575,530 A * | 11/1996 | Harper et al. ........ 297/183.2 X |
| 5,668,526 A | 9/1997 | Collins .................. 359/871 X |
| 5,772,279 A | 6/1998 | Johnson, Jr. ................ 297/130 |
| 5,884,827 A * | 3/1999 | Stein .......................... 224/614 |
| 5,977,086 A | 12/1999 | Gibson et al. ......... 297/256.16 |
| 6,000,753 A * | 12/1999 | Cone, II ................ 297/256.16 |
| 6,017,088 A | 1/2000 | Stephens et al. ....... 297/256.16 |
| 6,070,890 A * | 6/2000 | Haut et al. .......... 297/256.16 X |

* cited by examiner

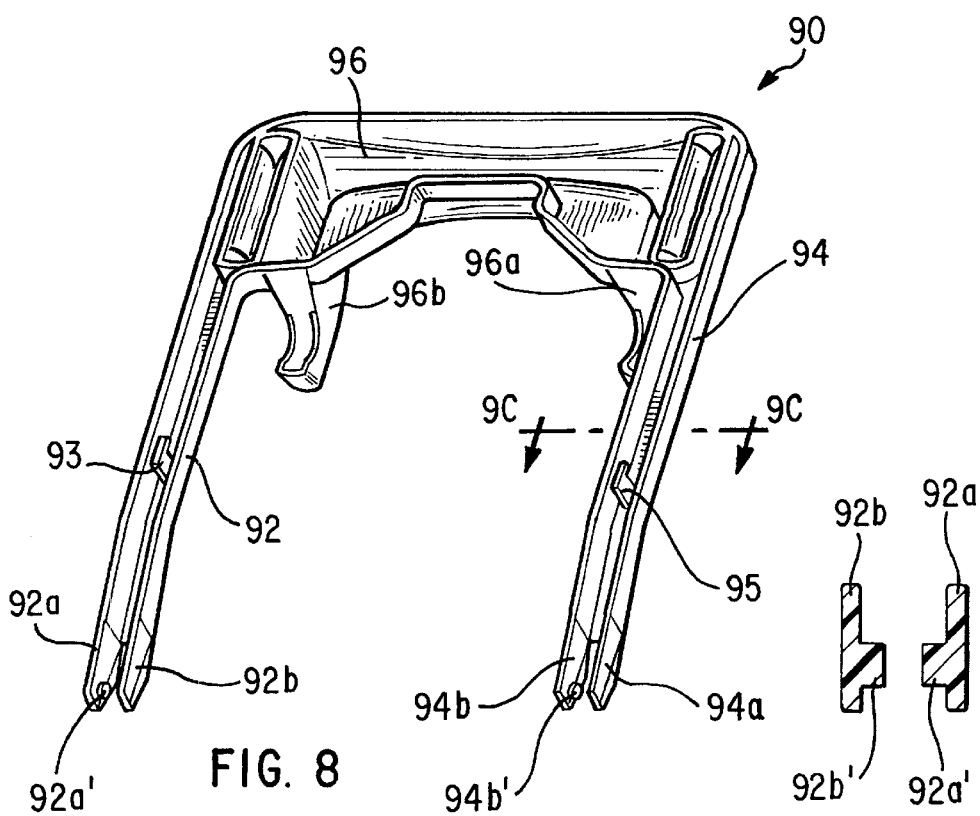
FIG. 8
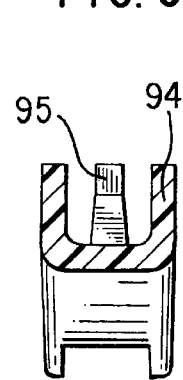
FIG. 9B
FIG. 9C
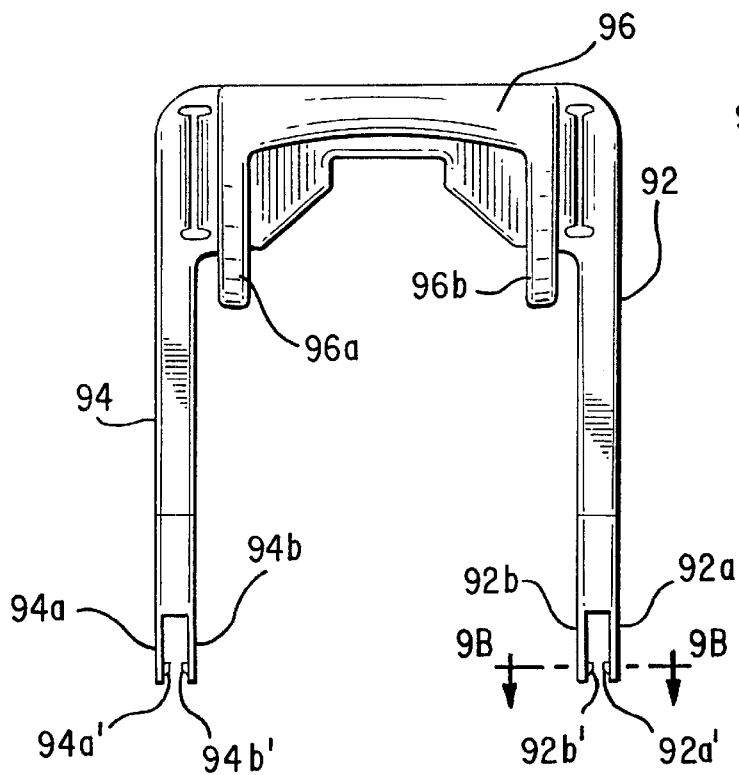
FIG. 9A

STAY IN VIEW CAR SEAT

FIELD OF INVENTION

The present invention relates to an infant car seat having a separate infant carrier that can be detachably connected to a base support or used by itself for mounting on a vehicle seat. More particularly, the invention relates to a rearwardly facing infant car seat with a removable infant carrier having an adjustable handle.

BACKGROUND OF THE INVENTION

Rearwardly facing infant car seats are needed to support small infants generally under 20 pounds in weight and less than 1 year old in a safe and secure position in the rear seat of a vehicle. A need exists for a car seat that can be conveniently removed from the vehicle to serve as an infant carrier and also provide a safe restraint for the infant when mounted in the vehicle either in combination with a separate base support or by itself. The infant carrier can also provide a means for supporting the infant in a stroller in a rearwardly facing direction. An infant carrier should provide a convenient means for carrying around a small infant while supporting the infant in a safe and comfortable position. In order to serve as such a carrier when removed from a vehicle, the carrier should have a handle that allows alternative ways of carrying depending on the size and strength of the person carrying the carrier.

An infant carrier that is intended to serve in various capacities as a car seat, a stroller seat and a convenient way to transport a small infant, requires a simple, easily operated connection mechanism that allows for engagement and disengagement with separate support structures. When the infant carrier is used as a car seat, the carrier can be belted directly to a vehicle seat or mated with a separate base support that can remain secured to the vehicle seat. When the infant carrier is used as a stroller seat, the carrier can be mounted on a grab bar formed as a portion of a tray or bolster or other attachment points on the stroller.

When a rearwardly facing infant car seat is mounted in the rear seat of a vehicle as recommended to provide the safest possible position for a small infant, an adult driver of the vehicle can not easily monitor the infant. Accordingly, existing infant car seats are often placed in the front seat of the vehicle against safety recommendations to allow the parent to keep an eye on the infant while driving the vehicle. This practice creates an unsafe condition in vehicles equipped with front passenger seat air bags, since the impact from a rapidly inflating air bag could cause serious injury to the infant, even when strapped into an infant car seat.

SUMMARY OF THE INVENTION

In view of the above desired applications and problems and disadvantages associated with conventional infant car seats, an infant car seat according to an aspect of the invention includes a separate infant carrier and base support for supporting the infant carrier in a rearwardly facing direction in a vehicle seat. The infant carrier includes an adjustable handle that is pivotally connected at opposite longitudinal ends of the carrier. The pivotal connections are positioned near the centers of the head and foot ends of the carrier and allow the handle to be moved to one side of the carrier or the other to provide easy access to the seating area of the carrier. The handle is preferably at least partially self-supporting so that it will remain separated from an infant in the carrier when positioned over the seating area.

The base support has a substantially L-shaped configuration with the primary axis of the base support being substantially vertical when mounted on a vehicle seat. An infant carrier engagement portion of the base support mates with the infant carrier and restrains the carrier against movement caused by inertial loads when the vehicle rapidly decelerates. A substantially vertical back portion of the base support extends above the foot end of the infant carrier when the carrier is mated with the base support and is positioned substantially parallel to the back of a vehicle seat. A mirror is mounted on the back portion of the base support. The mirror is positioned so that an adult driver of the vehicle can see the infant in the carrier in the vehicle's rear view mirror.

The infant carrier is provided with separate engagement mechanisms for releasably locking the carrier to the base support when in use as a car seat, and to a stroller attachment when in use as a stroller seat. In a preferred embodiment the engagement mechanisms are latch hooks that are actuated by linear reciprocation of a handle mounted on the rear side of the carrier opposite from the seating surface. A biasing means urges the handle to a retracted position at which respective latch hooks are engaged with either the base support on a vehicle seat or a stroller attachment.

BRIEF DESCRIPTION OF THE DRAWINGS

FIG. 8 is a perspective view from one side of an actuating mechanism according to an embodiment of the invention.

FIG. 9A is a perspective view from the opposite side of the actuating mechanism shown in FIG. 8.

FIG. 9B is a sectional view taken along line 9B—9B in FIG. 9A.

FIG. 9C is a sectional view taken along line 9C—9C in FIG. 8.

DETAILED DESCRIPTION OF THE PREFERRED EMBODIMENTS

Figure 1:
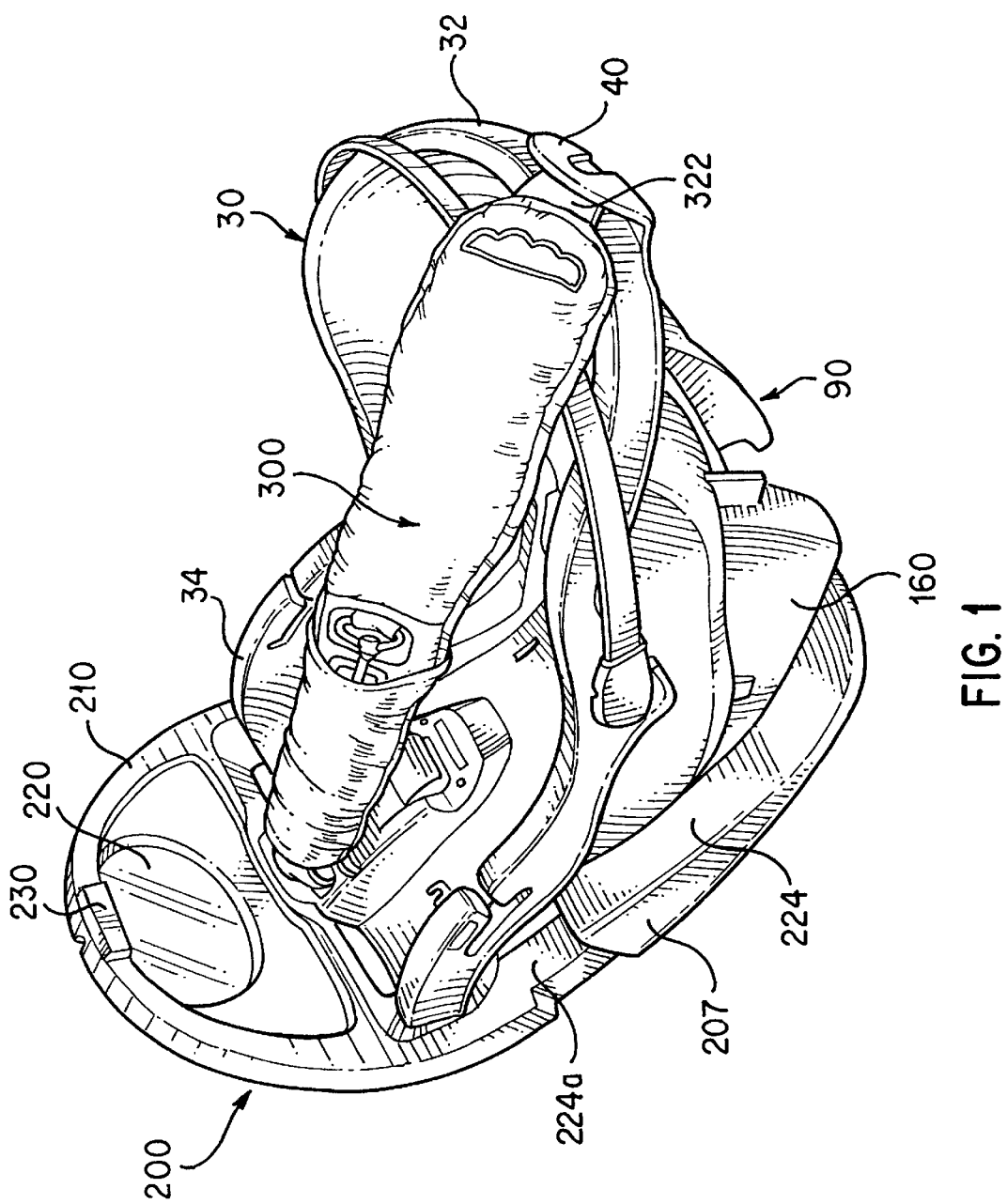
FIG. 1 is a perspective view of an infant carrier having an adjustable handle and being mounted in a base support, according to an embodiment of the invention.

Referring initially to FIG. 1, an infant carrier 30 according to an aspect of the invention is shown mounted on a separate base support 200 designed to be left in a vehicle when the infant carrier is removed. Although the carrier is shown mounted to a separate base support, the infant carrier can be used by itself as a rearwardly facing car seat. The infant carrier can be molded from plastic material to form a carrier shell that is then lined with soft goods (not shown) to provide a comfortable seating surface for an infant. The carrier is provided with a handle 300 that extends between longitudinally opposed ends 32, 34 of the infant carrier 30 and is pivotally mounted to at least one of the two ends 32, 34. The handle 300 is self-supporting along at least a portion of its length so that when positioned over the infant carrier, the handle will not drape into contact with the infant and so that the handle can be easily moved to one side or the other of the carrier for easy access to the infant.

Figure 7:
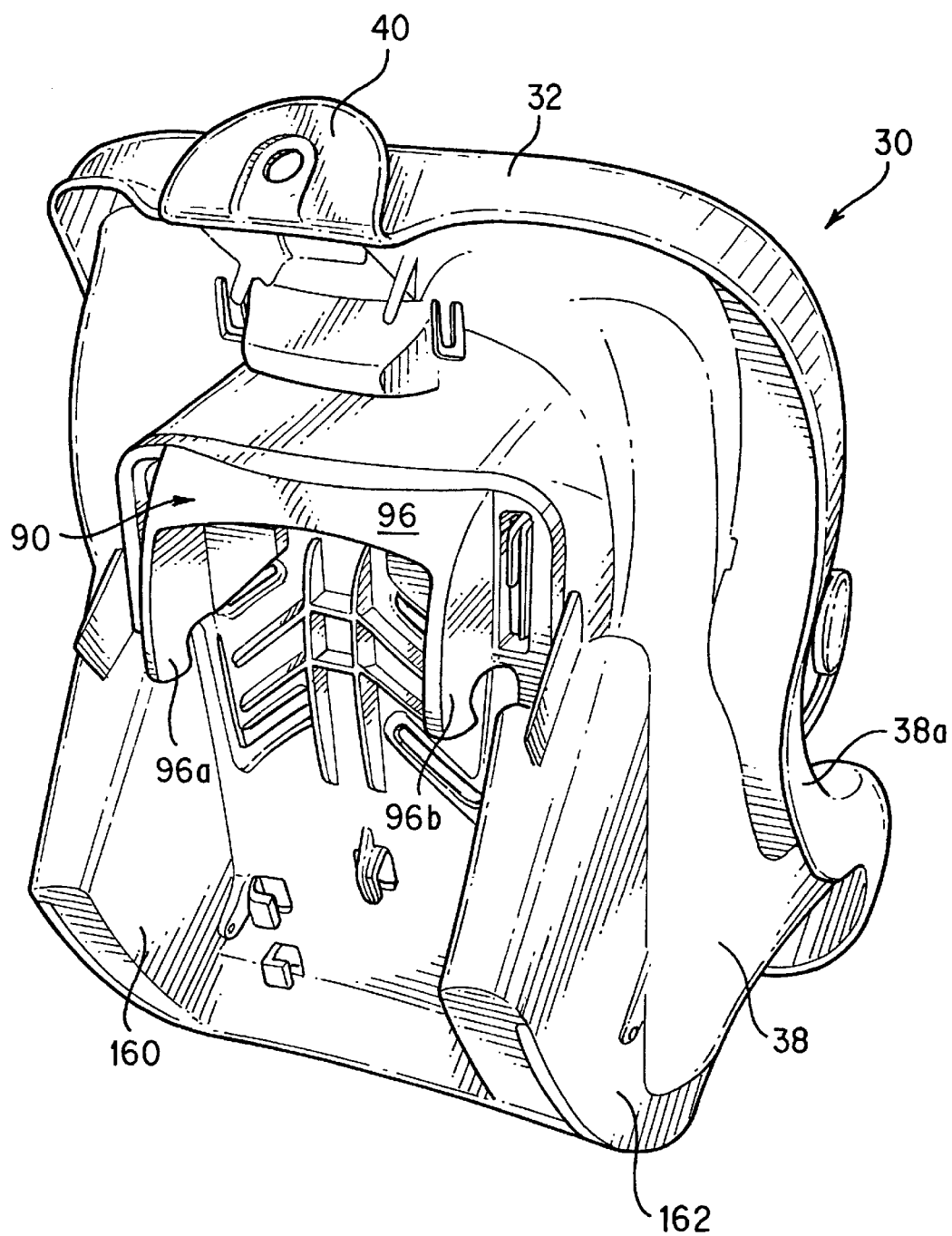
FIG. 7 is a rear perspective view of the infant carrier according to the invention.

The infant carrier is also provided with a sliding release handle 90, best seen in FIGS. 7, 8 and 9A. The release handle 90 is mounted for linear, reciprocating movement in the axial direction of the infant carrier. The release handle 90 actuates separate latch hooks 150 and 154 (hook 150 is shown in FIGS. 4 and 13A–13E, hook 154 is a mirror image of hook 150 but is not shown in the figures) that are pivotally mounted to the shell of the infant carrier and that engage with raised bosses 214 and 216 on the base support 200, best seen in FIG. 3A, as will be explained in more detail below. The release handle 90 also can be formed integrally with laterally spaced hooks 96a and 96b, best seen in FIGS. 7, 8 and 9A, that provide a separate engagement mechanism when the infant carrier is mounted in a stroller.

Figure 3A:
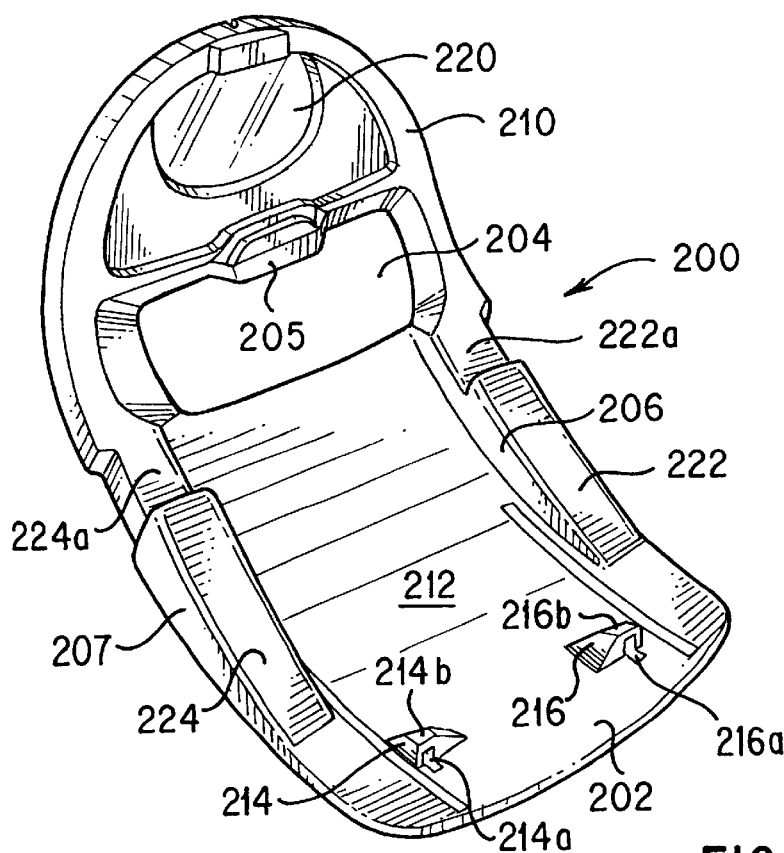
FIG. 3A is a perspective view of a base support according to the invention.

The separate base support 200, best seen in FIG. 3A, can be left belted to a vehicle seat to provide a convenient mechanism for securely holding the infant carrier to the vehicle seat when it is used as a car seat. The primary axis of the base support extends in a substantially vertical direction, parallel to the back of the car seat. A mirror 220 is mounted to the upper end of the base support in a position that allows an adult driver of the vehicle to see the infant in the rearwardly facing car seat by looking in the rear view mirror of the vehicle.

Detailed descriptions of the infant carrier, its longitudinal handle and the base support, according to preferred embodiments of the invention, are set forth below.

Infant Carrier

Figure 2:
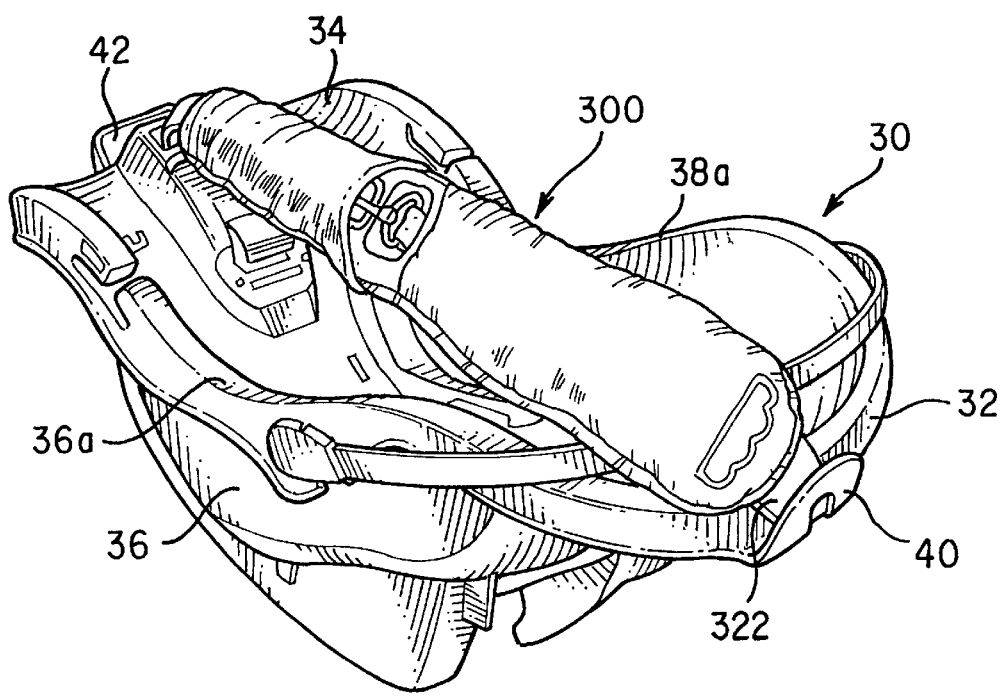
FIG. 2 is a perspective view of an infant carrier according to an embodiment of the invention.
Figure 4:
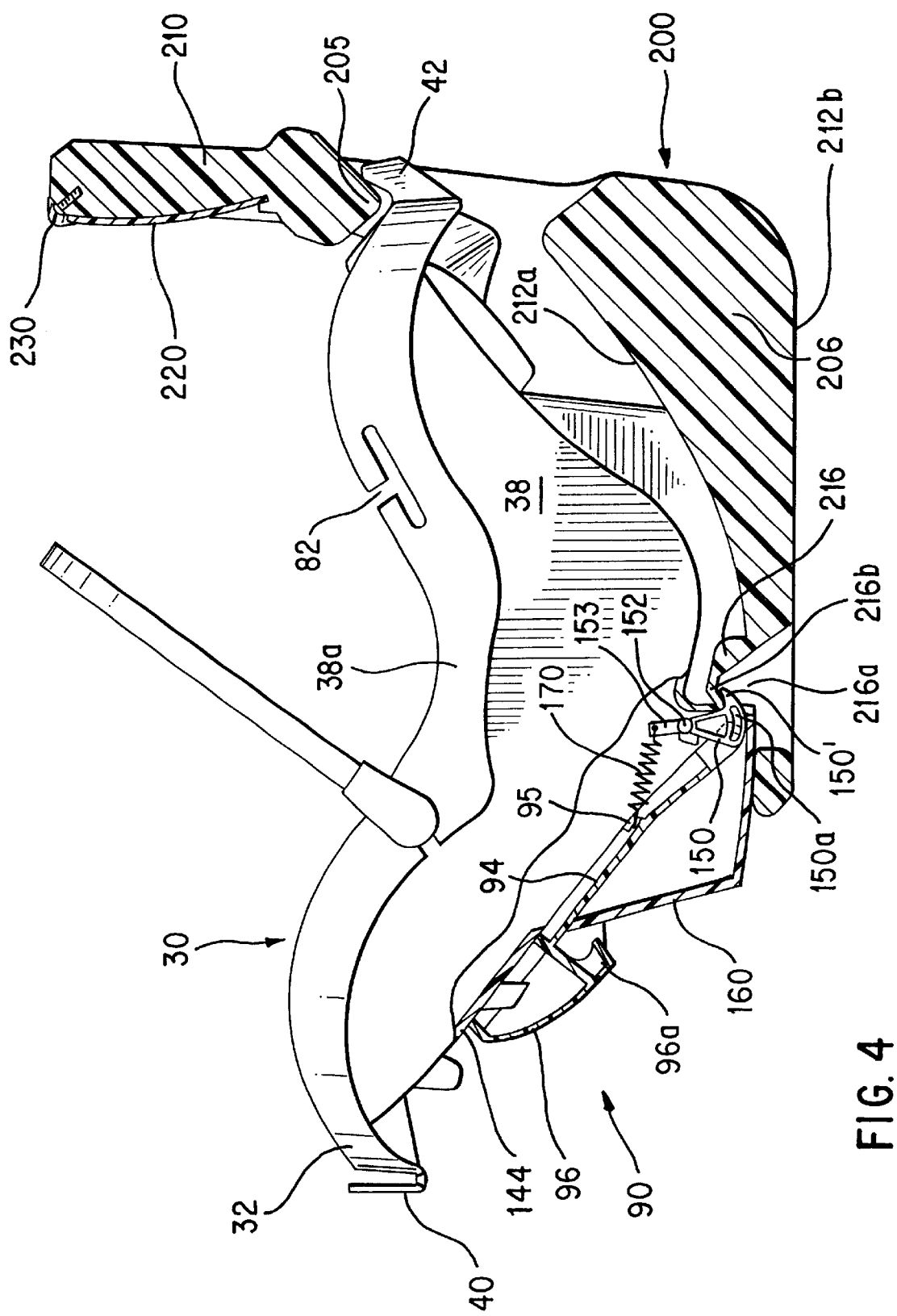
FIG. 4 is a cut away view of the infant carrier according to the invention mounted on the base support.

As best seen in FIGS. 2, 4 and 7, the infant carrier 30 is formed from a shell having a substantially L-shaped configuration. The head end 32 of the carrier 30 is provided with a centrally located flange 40 to which one end of a longitudinal handle 300, best seen in FIGS. 1 and 2, can be pivotally attached. The foot end 34 of the carrier 30 has a centrally located, upturned protrusion 42 that will hook underneath a downwardly extending protrusion 205, seen in FIG. 3A, on the base support 200 when the carrier is mounted to the base support for use as a car seat.

Figure 5:
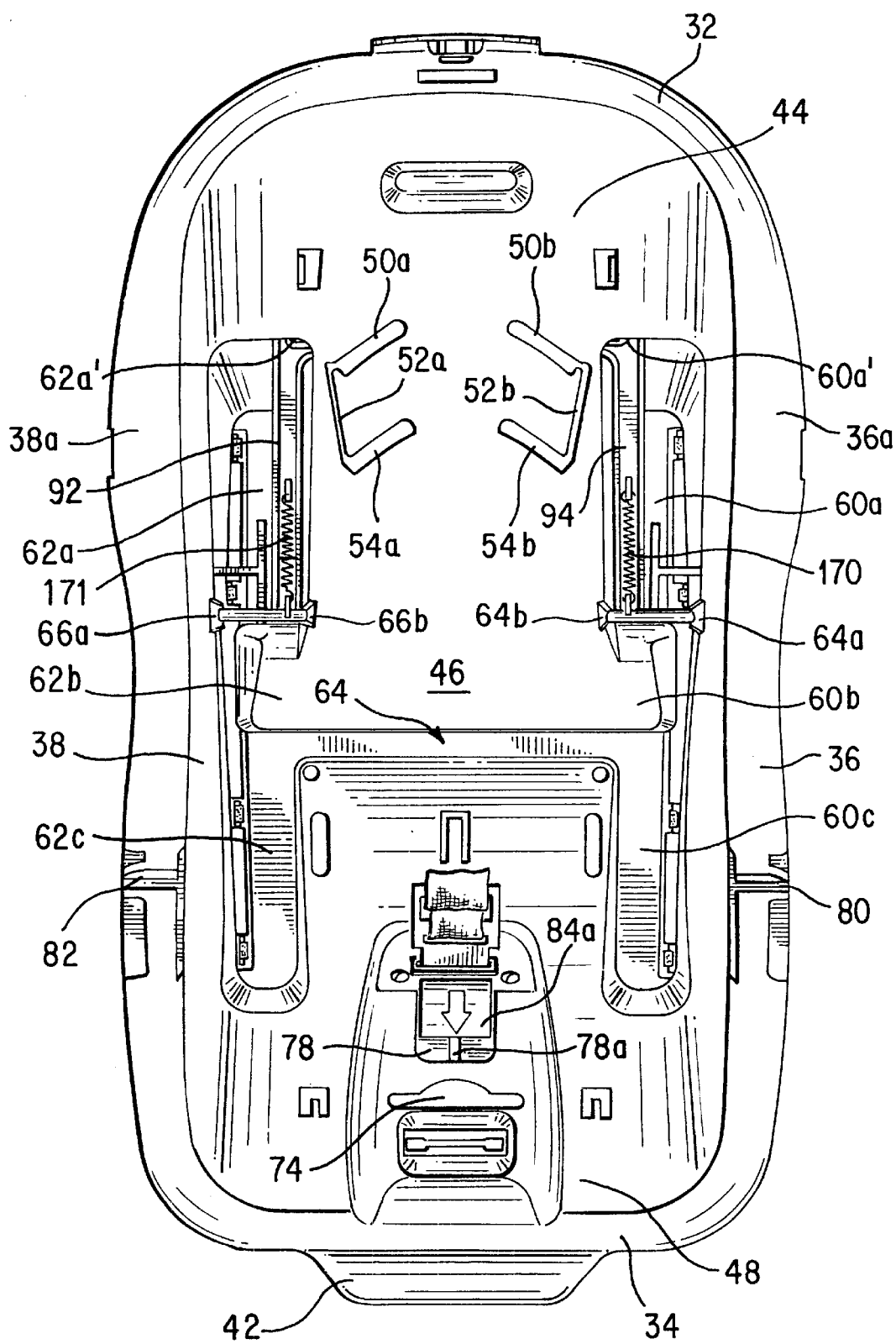
FIG. 5 is a top plan view of the infant carrier shell according to the invention.

A seating surface is formed in the infant carrier by placing soft goods (not shown) over the top surfaces 44, 46 and 48, shown in FIG. 5. Surface 44 normally provides support for the back and head of an infant, surface 48 normally supports the buttocks and legs of the infant, and surface 46 joins the surfaces 44 and 48 at the apex of the L-shaped configuration. As shown in FIGS. 2, 4 and 7, sides 36 and 38 of the infant carrier 30 are substantially triangular in shape. Sides 36 and 38 extend upwardly from the seating surfaces 44, 46 and 48, terminating at side rails 36a and 38a.

As shown in FIG. 5, substantially collinear recessed channels 60a and 60c can be formed into top surfaces 44 and 48, extending in an axial direction of the carrier just inboard of side wall 36 and separated from each other by a non-recessed side portion 60b of top surface 46. Similarly, substantially collinear recessed channels 62a and 62c can be formed into top surfaces 44 and 48, extending in an axial direction of the carrier just inboard of opposite side wall 38 and separated from each other by non-recessed side portion 62b of top surface 46.

Figure 6:
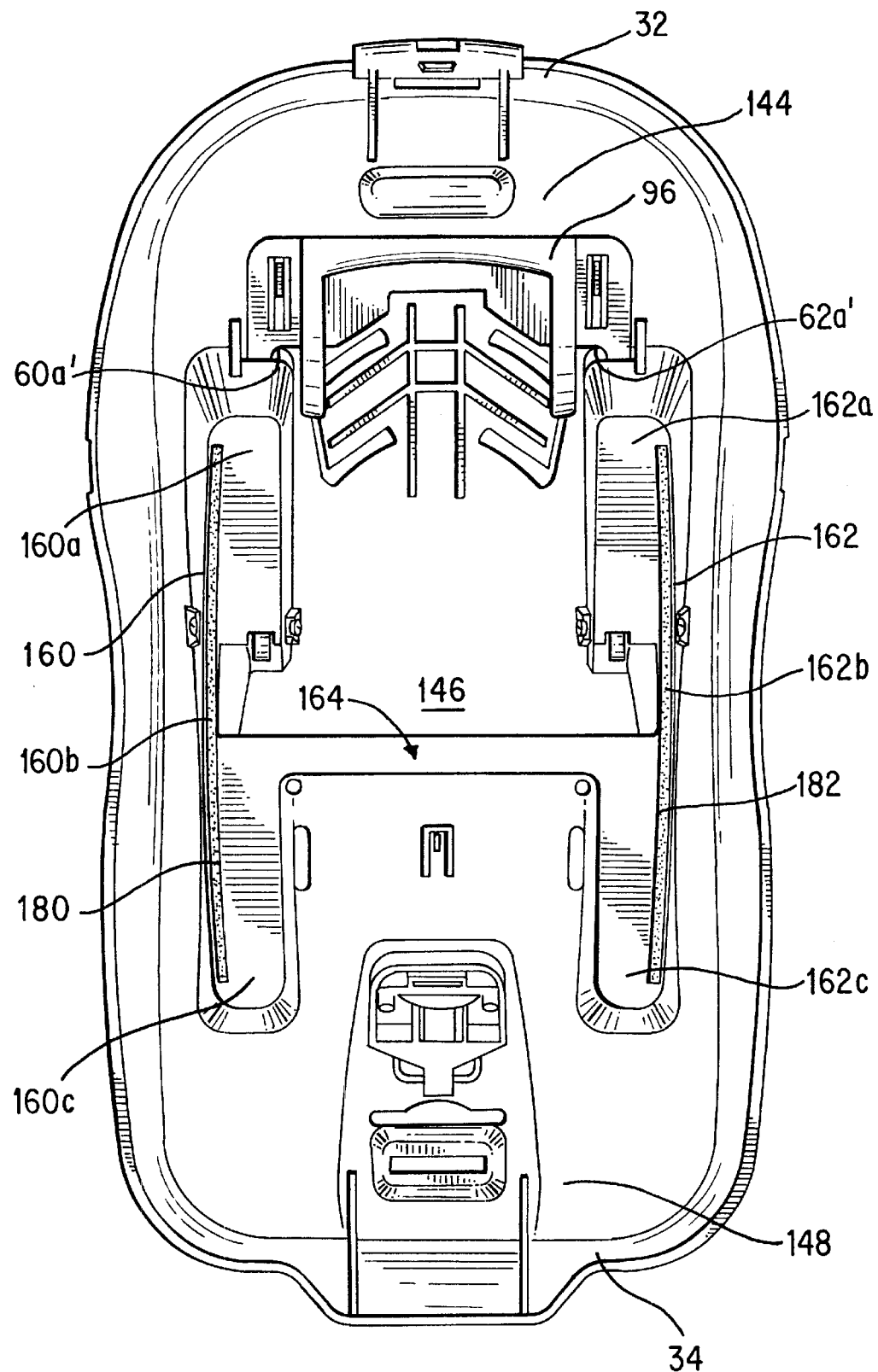
FIG. 6 is a bottom plan view of the infant carrier shell shown in FIG. 5.

As seen in FIG. 6, the bottom side of the carrier has surfaces 144, 146 and 148 opposite respective top surfaces 44, 46 and 48. Protruding, axially extending runner segments 162a and 162c are formed opposite recesses 62a and 62c, and protruding, axially extending runner segments 160a and 160c are formed opposite recesses 60a and 60c. A thin wall section 162b joins runner segments 162a and 162c to form a continuous runner 162 extending along one side of the bottom of the carrier, and a thin wall section 160b joins runner segments 160a and 160c to form a continuous runner 160 extending along the opposite side of the bottom of the carrier. The runners 160 and 162, best seen in FIG. 7, serve to support the infant carrier 30 in a reclined position for proper support of an infant, whether the carrier 30 is mounted in the base support 200, or placed directly on a vehicle seat or other flat surface. As seen in FIG. 6, non-skid strips 180 and 182 can be attached along the outer edges of runners 160 and 162 to provide a frictional force between the carrier and a surface on which it is rested. Runner segments 160c and 162c are joined by a transverse rib 164 extending from the bottom surface 146 near the apex of the carrier.

The recessed channels 60a and 62a are provided with openings 60a' and 62a', respectively, that pass through the shell of the carrier at the ends of the recessed channels near the head end 32 of the carrier, intersecting top surface 44 and bottom surface 144. Openings 60a' and 62a' provide passageways for spaced, parallel arms 92, 94 of release handle 90 shown in FIGS. 5, 8 and 9A. The release handle 90 has a transverse grasping portion 96 at one end connecting the spaced, parallel arms 92, 94. The grasping portion 96 slides along the bottom surface 144 of infant carrier 30 in a linear, reciprocating motion, as the arms 92, 94 move within recessed channels 60a and 62a. As best seen in FIGS. 8 and 9A, laterally spaced hook portions 96a and 96b extend from the bottom surface of release handle 90 and are preferably molded integrally with the grasping portion 96 just inboard from parallel arms 92 and 94. Hook portions 96a and 96b are provided for use when the infant carrier 30 is to be mounted on a stroller. When the release handle is slid in the axial direction of the carrier the hook portions 96a and 96b engage and disengage from spaced attachment points on the stroller (not shown).

As best seen in FIGS. 9A and 9B, the ends of arms 92, 94 on release handle 90 opposite from the grasping portion 96 are bifurcated so that arm 92 has parallel end segments 92a and 92b, and arm 94 has parallel end segments 94a and 94b. Pins 92a' and 92b' project toward each other from the spaced end segments 92a and 92b, and pins 94a' and 94b' project toward each other from the spaced end segments 94a and 94b. The bifurcated ends of arms 92 and 94 provide a mechanism for actuating latch hooks 150 and 154, (hook 150 is best seen in FIGS. 13A–13E, and hook 154 is a mirror image of hook 150), to release the infant carrier from the base support 200.

Figure 13A:
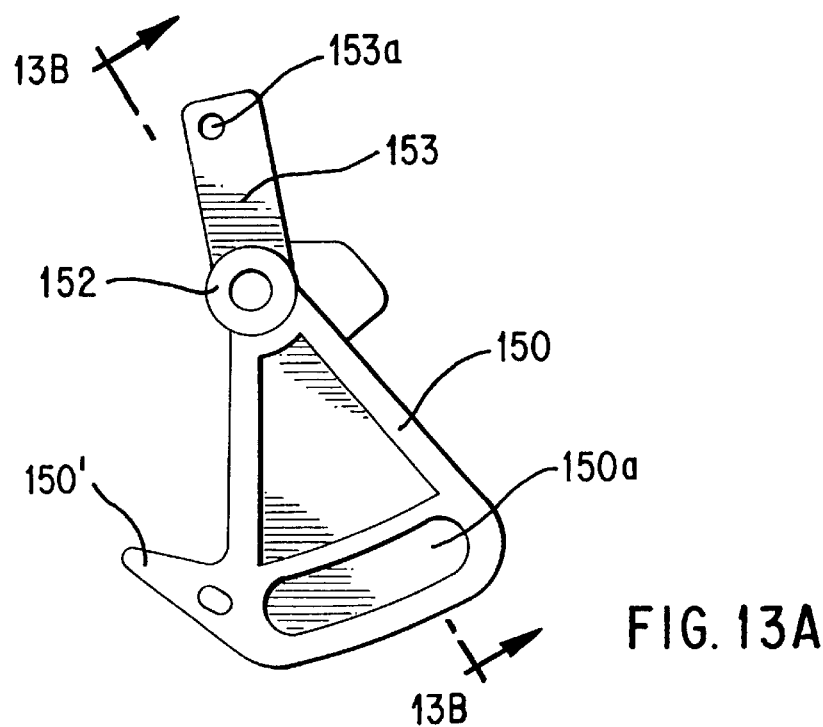
FIG. 13A is a side elevation view of a latch hook according to the invention.
Figure 13B:
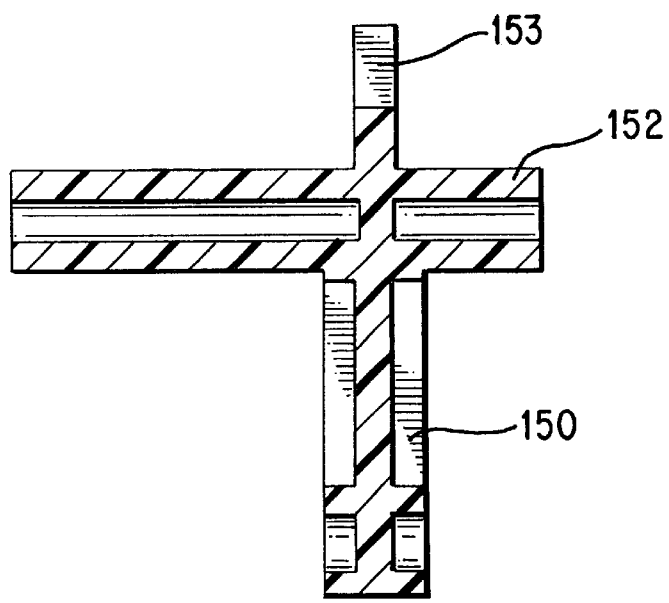
FIG. 13B is a sectional view taken along lines 13B—13B in FIG. 13A.
Figure 13C:
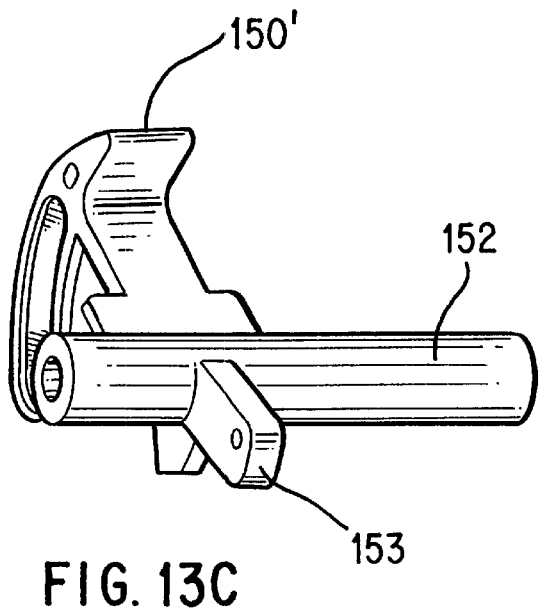
FIG. 13C is a perspective view from one side of the latch hook shown in FIG. 13A.
Figure 13D:
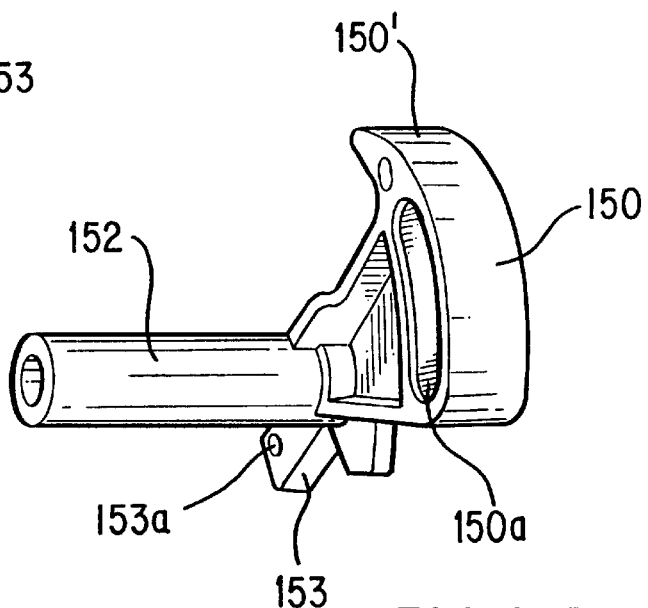
FIG. 13D is a perspective view from the other side of the latch hook shown in FIG. 13A.
Figure 13E:
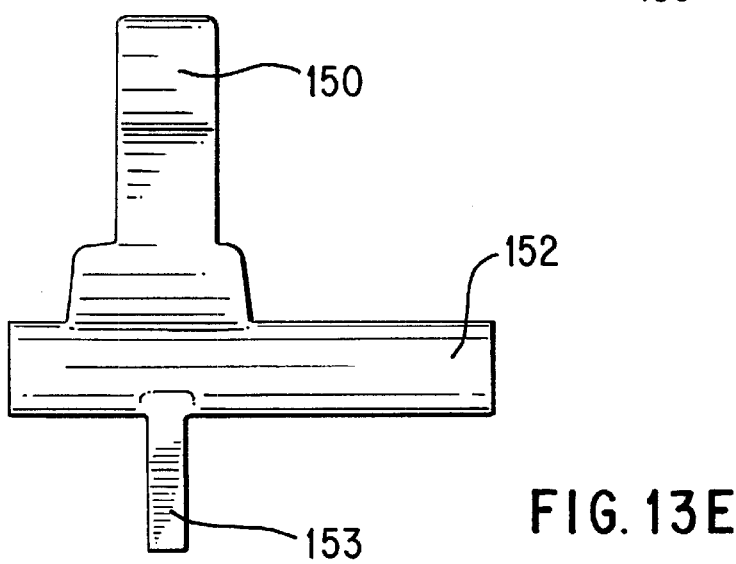
FIG. 13E is a plan view of the latch hook shown in FIG. 13A.

Latch hook 150 is preferably formed integrally with a pivot rod 152 that is mounted between bosses 64a and 64b on opposite sides of recessed channel 60a, shown in FIG. 5. The bosses 64a and 64b are positioned on laterally opposite sides of recessed channel 60a near the axial end of recessed channel 60a opposite from the opening 60a'. As shown in FIG. 13A, an integral tab 153 on the opposite side of pivot rod 152 from latch hook 150 is provided with an opening 153a for attachment to one end of a spring 170, seen in FIGS. 4 and 5. The opposite end of spring 170 is attached at a tab 95 formed at an intermediate point on arm 94 of release handle 90. As shown in FIG. 13A, an arcuate slot 150a is formed in hook 150 to receive the pins 94a' and 94b' projecting between bifurcated ends 94a, 94b of arm 94 on release handle 90. The arcuate slot 150a allows the hook 150 to pivot about pivot rod 152 relative to the shell of the infant carrier 30, through an arc the length of the slot 150a without movement of the arm 94.

In the same fashion as latch hook 150, latch hook 154 is preferably formed integrally with a pivot rod 155 that is mounted between bosses 66a and 66b on opposite sides of recessed channel 62a, shown in FIG. 5. An integral tab 156 on the opposite side of pivot rod 155 from latch hook 154 is provided with an opening 156a for attachment to one end of a spring 171. The opposite end of spring 171 is attached at a tab 93 formed at an intermediate point on arm 92 of release handle 90. An arcuate slot 154a is formed in hook 154 to receive pins 92a' and 92b' projecting between bifurcated ends 92a and 92b of arm 92. The arcuate slot 154a allows the hook 154 to pivot about rod 155 relative to the shell of the infant carrier 30, through an arc the length of the slot 154a without movement of the arm 92.

The tips of the latch hooks 150 and 154 point toward the foot end 34 of the infant carrier 30 and are biased in that direction as a result of the springs 170 and 171 pulling back on tabs 153 and 156, as shown for hook 150 in FIG. 4. When the infant carrier 30 is inserted into the base support 200, the outer surfaces 150' and 154' of the latch hooks act as camming surfaces against protrusions on the base support 200 (to be described in more detail below). As the infant carrier is pressed into position on the base support the latch hooks 150 and 154 pivot about their pivot rods against the biasing force of springs 170 and 171 until they are cleared of the corresponding camming surfaces on the base support, and then springs 170 and 171 rotate the latch hooks into recesses formed in the base support to retain the carrier on the base support.

When the release handle 90 is slid toward the head end 32 of the infant carrier by pulling back on grasping portion 96, the arms 92 and 94 are partially withdrawn from recessed channels 62a and 60a through openings 62a' and 60a'. Pins 92a', 92b', 94a' and 94b' at the ends of arms 92 and 94 are normally engaged with the ends of corresponding arcuate slots 154a and 150a in latch hooks 154 and 150 as a result of the biasing of the tips of the hooks toward the foot end 34 of the infant carrier. Accordingly, movement of the release handle 90 toward the head end 32 of the infant carrier forces the tips of the hooks to disengage from the base support as the hooks pivot relative to the shell of the infant carrier, moving the tips of the hooks 154, 150 away from the foot end 34 of the infant carrier. When the infant carrier 30 is mounted on a stroller, movement of the release handle 90 toward the head end 32 of the infant carrier also disengages integral hook portions 96a and 96b near the grasping portion 96 from the attachment portions of the stroller.

As best seen in FIG. 5, slots 50a, 50b, 52a, 52b, 54a and 54b can also be provided through the shell of the infant carrier from top surface 44 to bottom surface 144 to allow passage of shoulder harnesses for restraining an infant in the carrier. Slots 50a and 50b could be selected for a larger infant, or the shoulder harnesses could be moved along axial slots 52a and 52b to lower transverse slots 54a and 54b for a smaller infant.

Figure 10A:
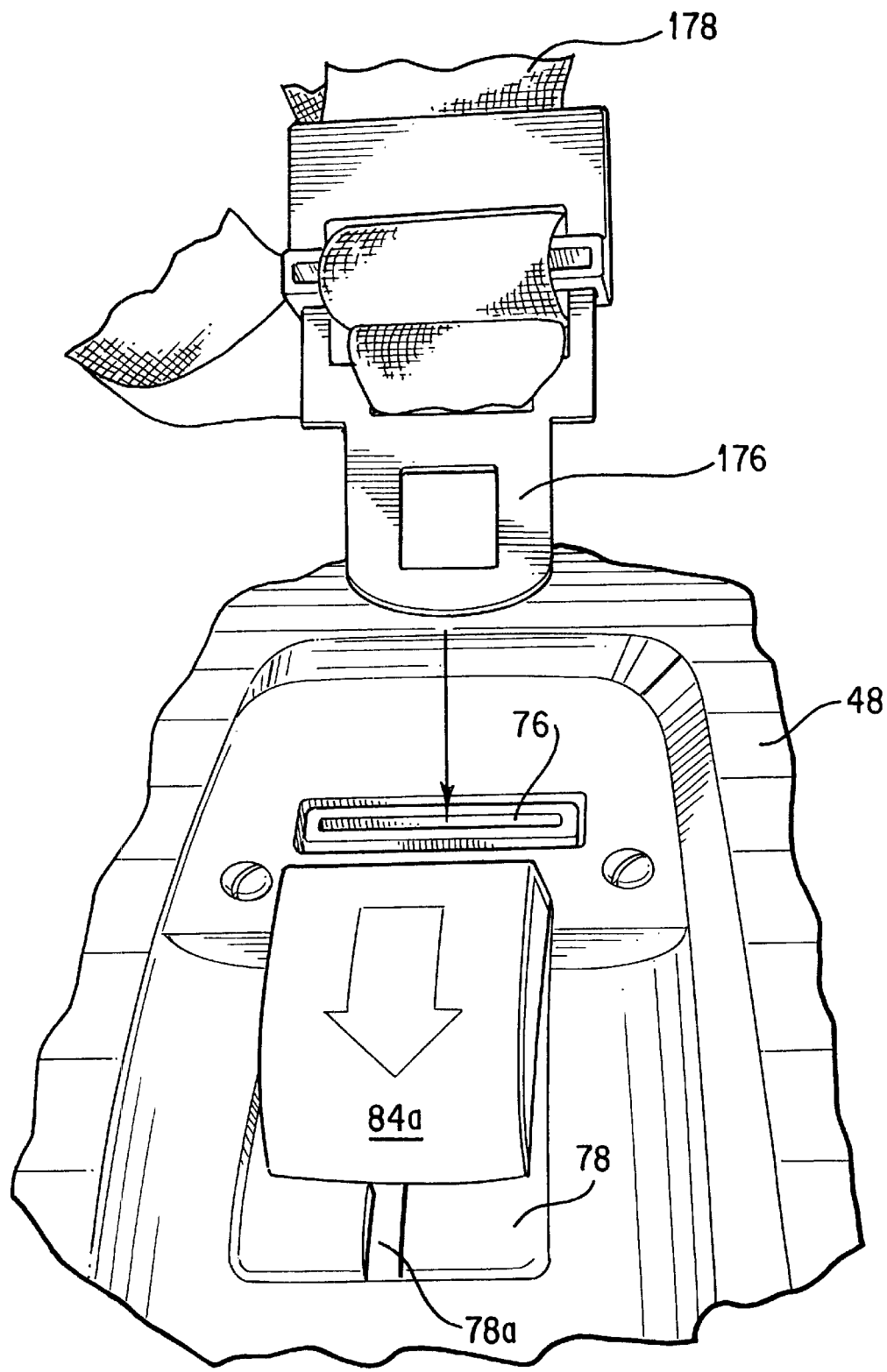
FIG. 10A is a perspective view showing a crotch strap tongue being inserted into a latch according to the invention.
Figure 10B:
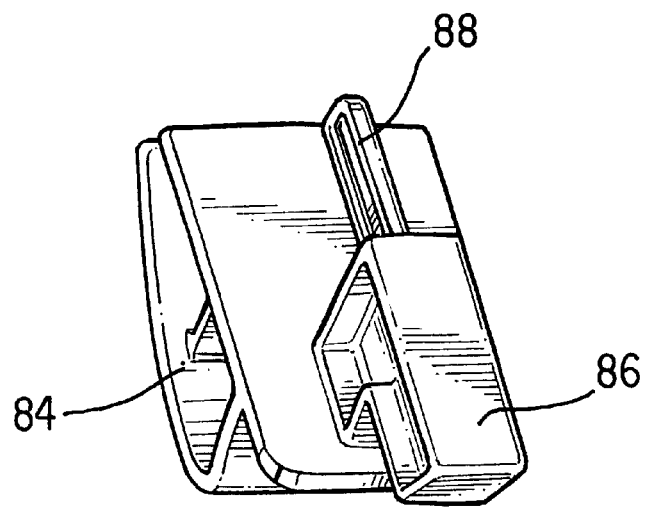
FIG. 10B is a perspective view of the bottom side of a latch according to the invention.
Figure 10C:
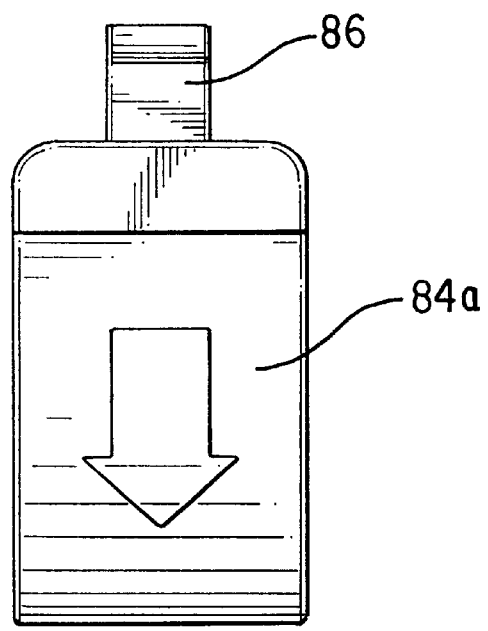
FIG. 10C is a top plan view of the latch shown in FIG. 10B.
Figure 10D:
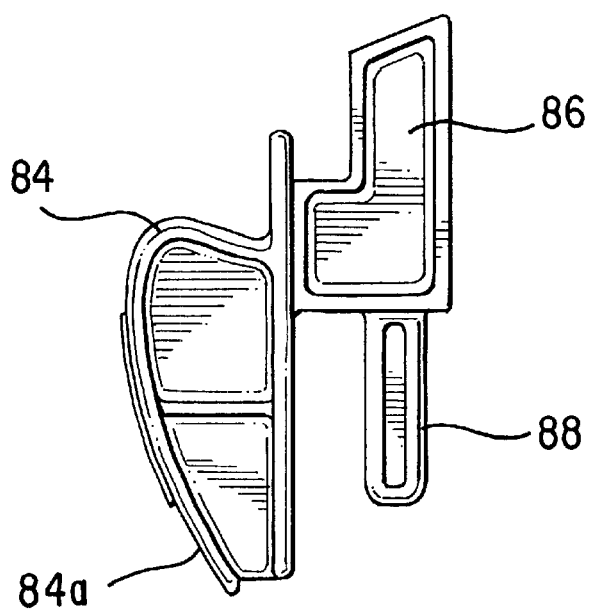
FIG. 10D is a side elevation view of the latch shown in FIGS. 10B.
Figure 10E:
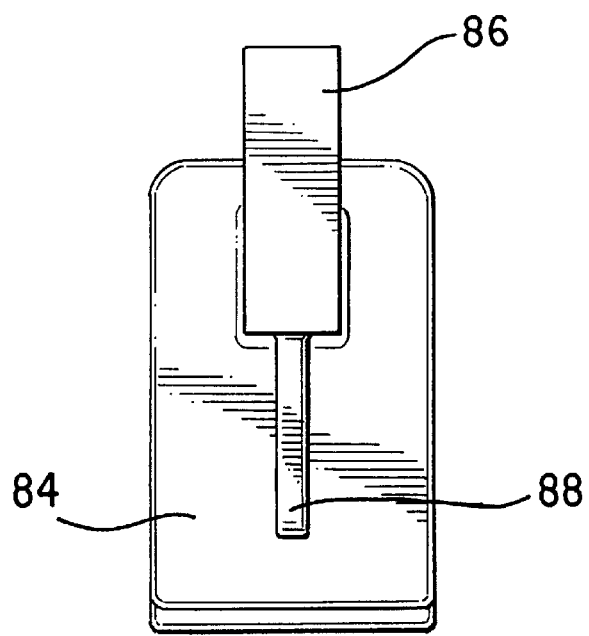
FIG. 10E is a bottom plan view of the latch shown in FIG. 10B.
Figure 11A:
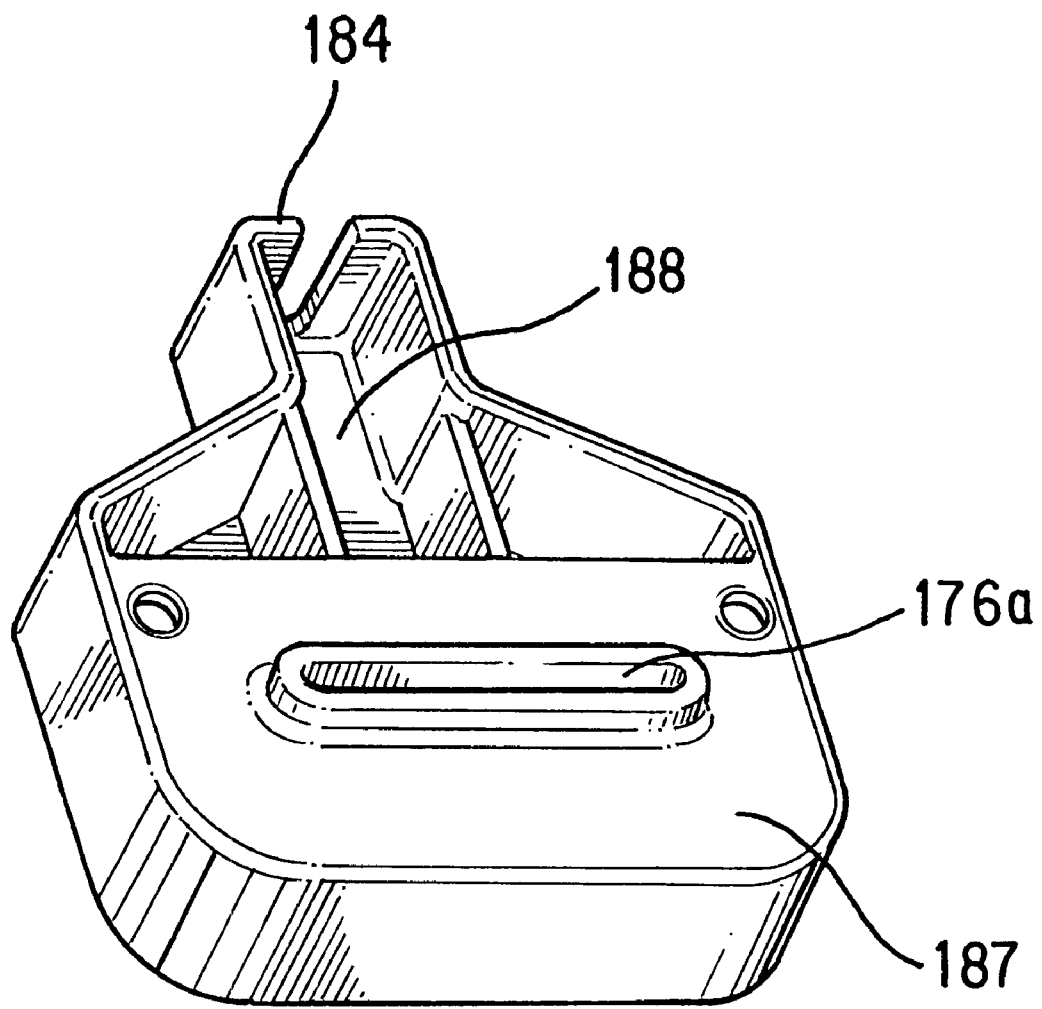
FIG. 11A is a bottom perspective view of a latch housing according to the invention.
Figure 11B:
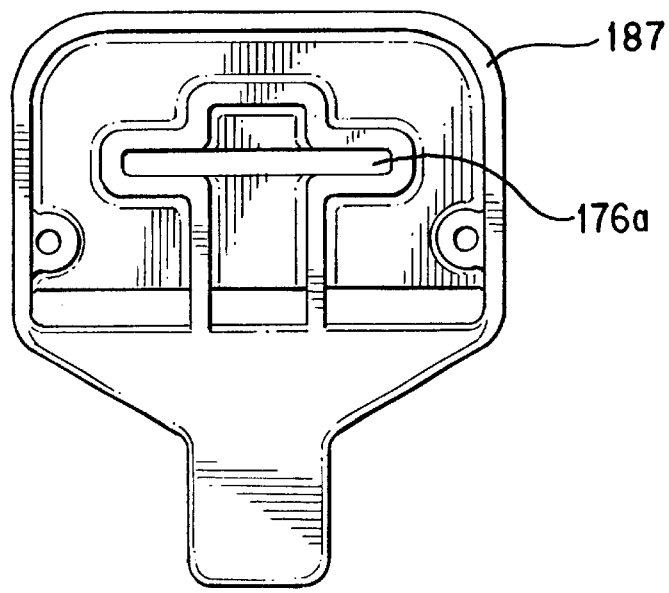
FIG. 11B is a top plan view of the latch housing shown in FIG. 11A.
Figure 11C:
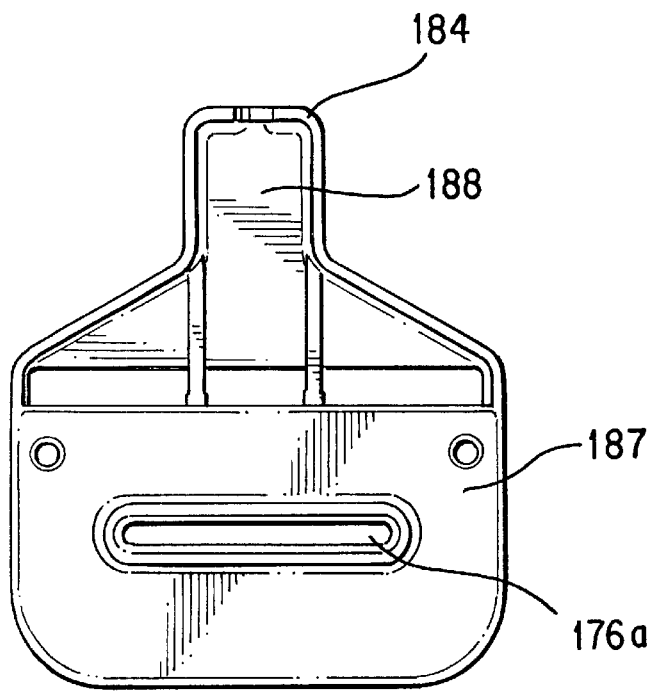
FIG. 11C is a bottom plan view of the latch housing shown in FIG. 11A.
Figure 12A:
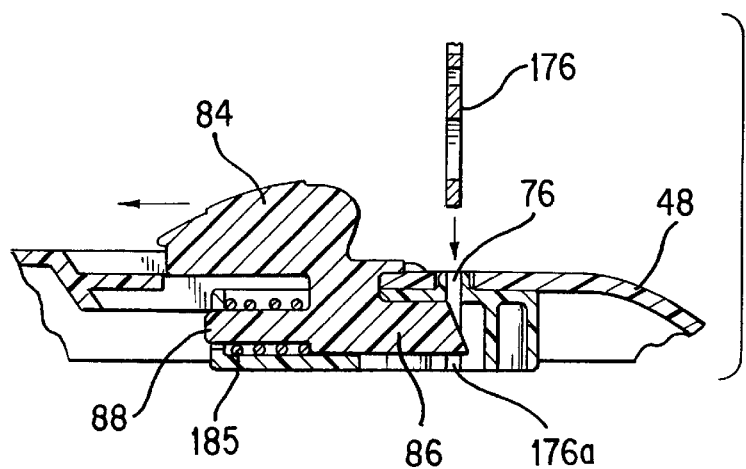
FIG. 12A is a sectional view showing a crotch strap tongue being inserted into the latch and latch housing assembly according to the invention.
Figure 12B:
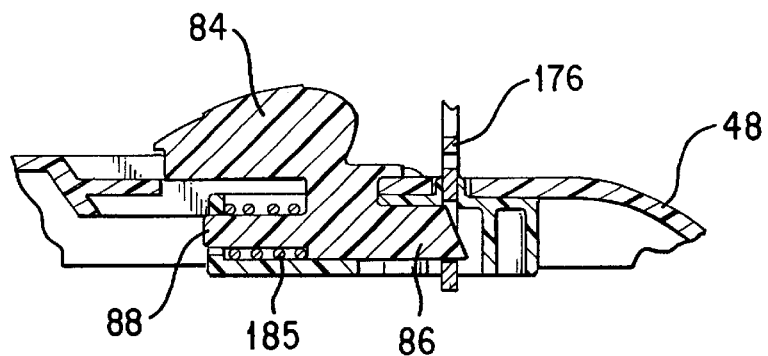
FIG. 12B is a sectional view showing the crotch strap tongue fully inserted and engaged with the latch in the latch and latch housing assembly shown in FIG. 12A.
Figure 12C:
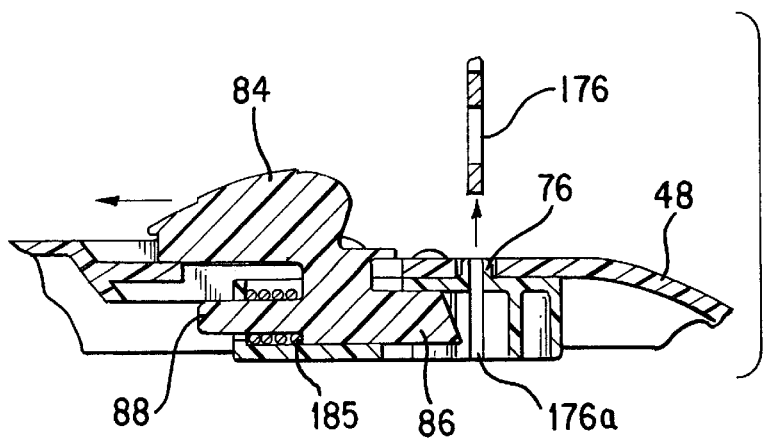
FIG. 12C is a sectional view showing the crotch strap tongue being removed from the latch and latch housing assembly shown in FIG. 12A.

At foot end 34 of infant carrier 30 a latch 84 for engagement with a crotch strap tongue 176, best seen in FIG. 10A, is slidably mounted on a central ramped portion 78 of top surface 48 for movement in an axial direction of the carrier toward and away from a tongue opening 76 passing through the carrier shell from top surface 48 to bottom surface 148. A latch housing 187, best seen in FIGS. 11A–11C, is fixed to the bottom surface 148 of the infant carrier opposite from the latch 84. The latch can be provided with an ergonomically shaped upper portion 84a, marked to show the direction in which the latch should be moved to disengage from the tongue 176 attached to a crotch strap 178 and inserted into tongue opening 76. The bottom portion of the latch extends through a slot 78a in the ramped portion 78, and includes a tongue engagement portion 86 and a spring post 88. The tongue engagement portion 86 and spring post 88 are slidably fitted within channel 188 of latch housing 187 on the bottom surface 148 of the carrier. An opening 176a through latch housing 187 lines up with tongue opening 76 through the carrier shell for receipt of the crotch strap tongue 176. The end 184 of channel 188 acts as a stop for a compression spring 185 that is placed over spring post 88 and biases the latch 84 toward the head end 32 of the carrier and into engagement with the crotch strap tongue when it is inserted into openings 76 and 176a, as best seen in FIGS. 12A–12C.

Side rails 36a and 38a of infant carrier 30 can be provided with T-shaped slots 80 and 82, best seen in FIG. 5, to act as seat belt pathways when the infant carrier is mounted directly on a vehicle seat for use as a rearwardly facing car seat.

Longitudinal Handle

As best seen in FIGS. 1 and 2, the infant carrier 30 can be provided with a longitudinal handle 300 that is connected between the centers of the head end 32 and foot end 34 of the infant carrier. The handle 300 is adjustable in length and comfortably padded so that it can be grasped by hand in a shortened configuration or slung over a shoulder in a longer configuration. The handle is also at least partially self-supporting so that when attached to the infant carrier it will not drape into the infant seating area, and so that it can be easily pivoted to one side or the other of the carrier to be positioned out of the way for access to the infant.

Figure 14A:
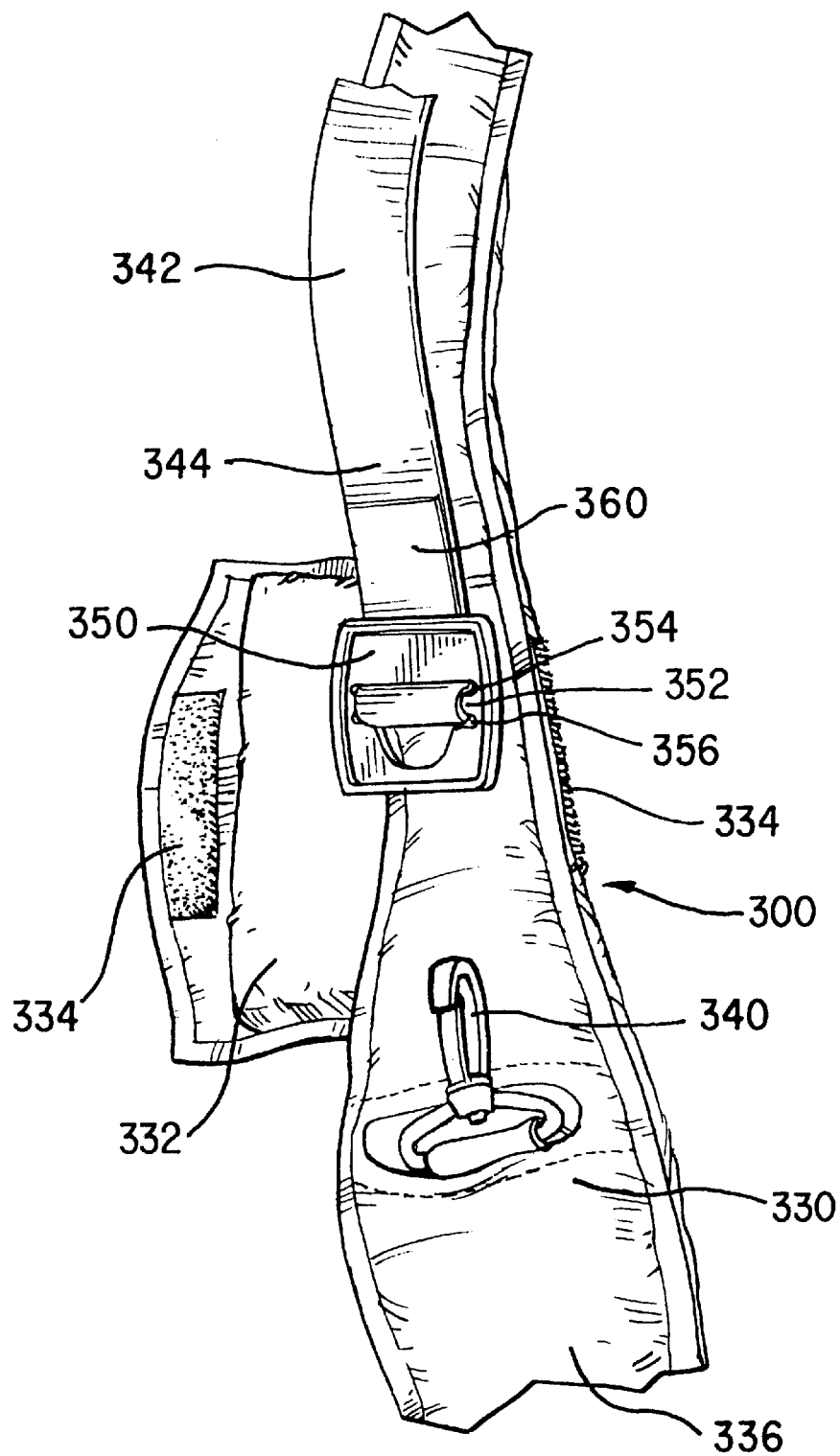
FIG. 14A is a perspective view of an adjustable handle in a partially adjusted configuration according to an embodiment of the invention.
Figure 14B:
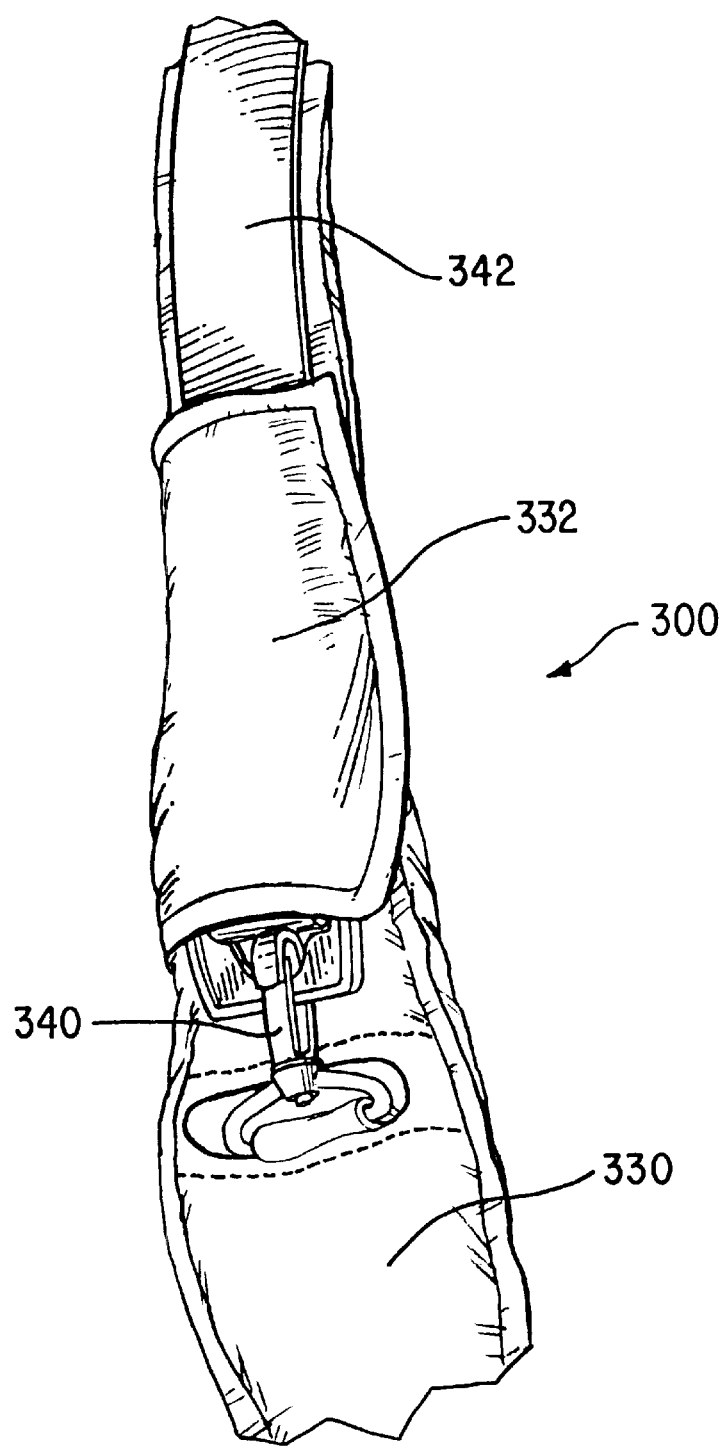
FIG. 14B is a perspective view of the adjustable handle shown in FIG. 14B in a shortened configuration.
Figure 14C:
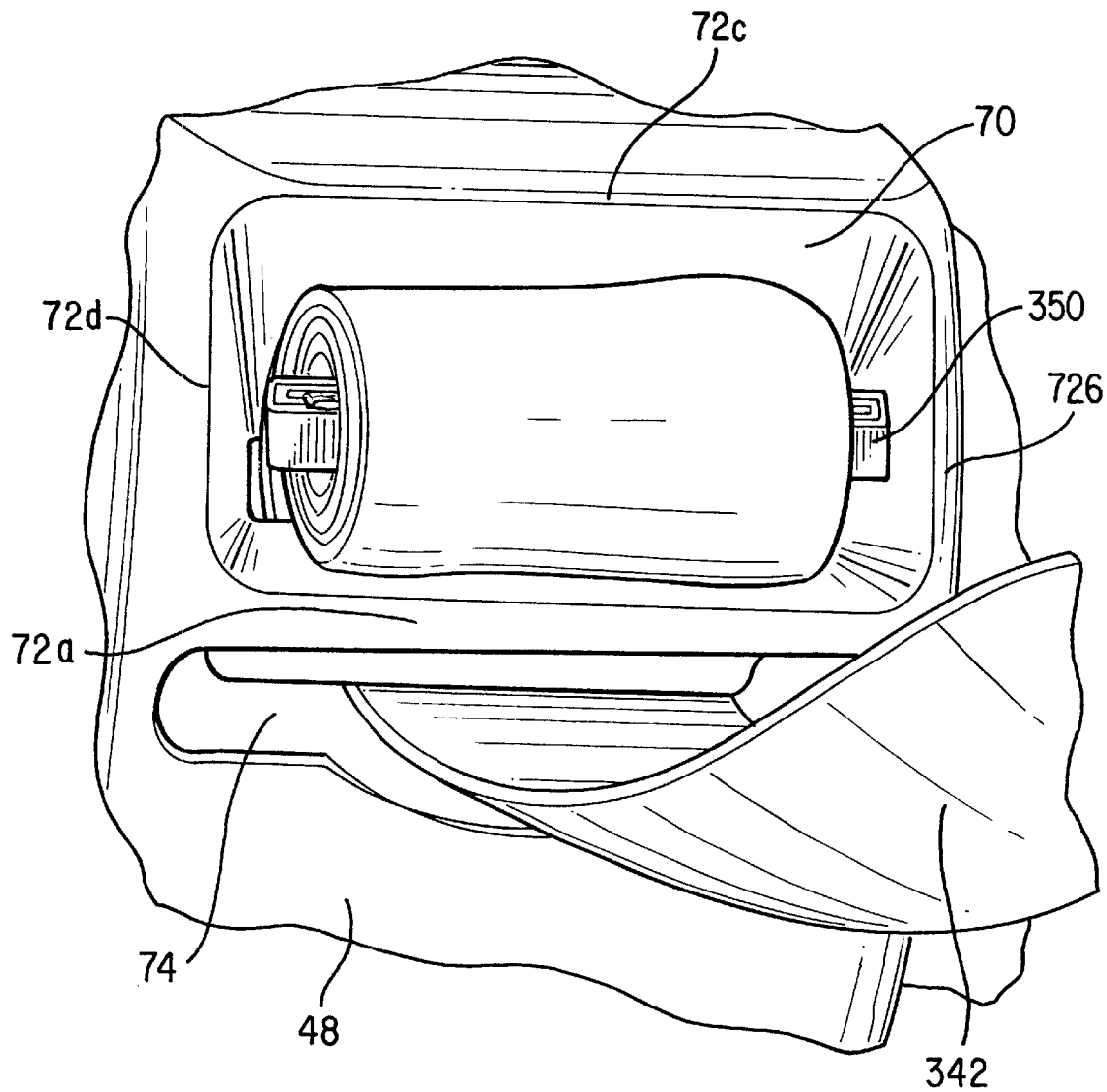
FIG. 14C is a perspective view of an adjusting feature at one end of the flexible strap on the adjustable handle according to an embodiment of the invention.
Figure 14D:
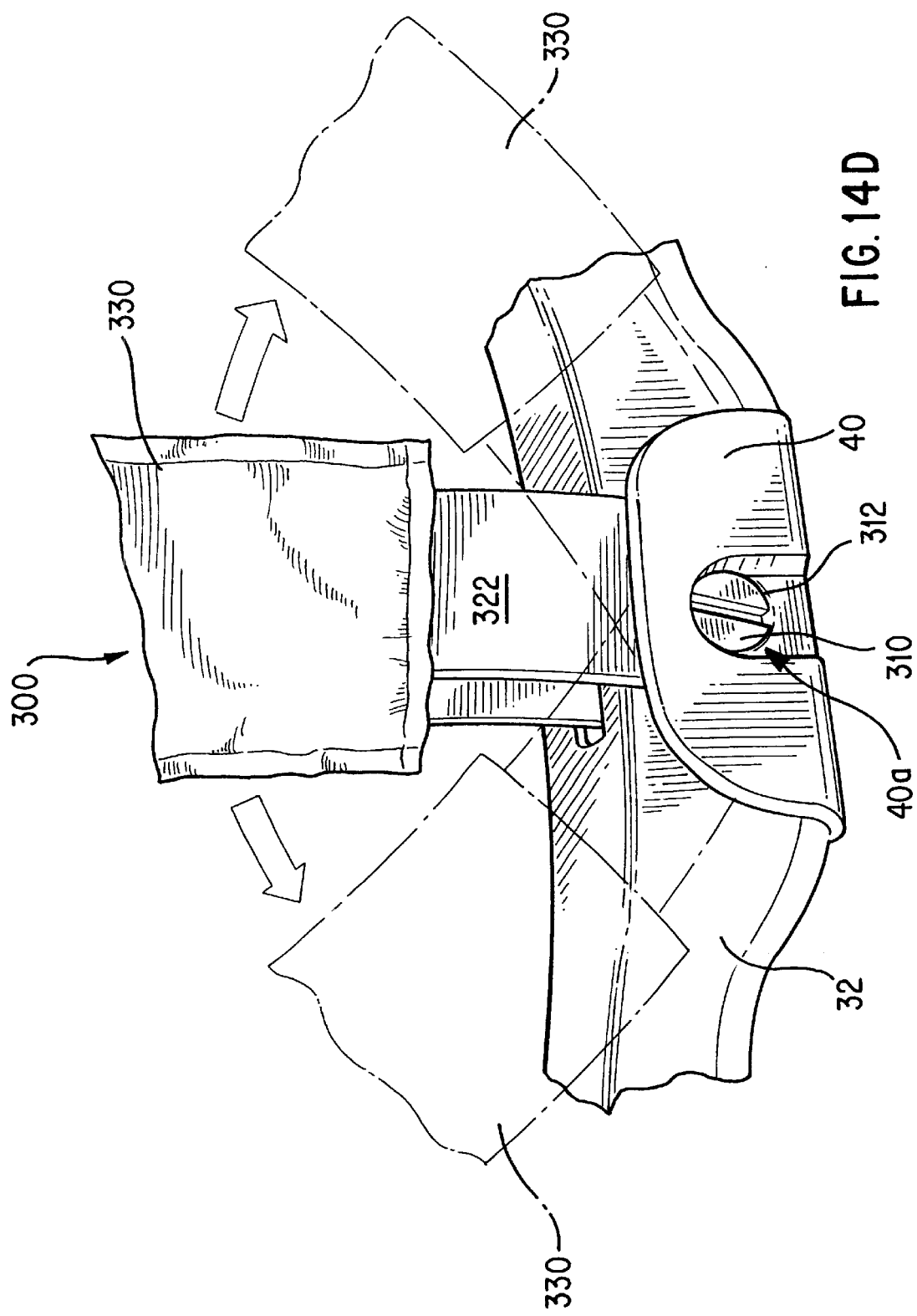
FIG. 14D is a perspective view of a pivotal connection of the adjustable handle to the infant carrier according to an embodiment of the invention.

A U-shaped flange 40 for pivotally attaching one end of the handle can be molded integrally with the head end 32 of the carrier or provided as a separate member that is connected to the head end 32 by any of a number of well known methods such as by screws, ultrasonically welding, etc. At the foot end 34 of the carrier a centrally located, substantially rectangular shaped cavity 70, best seen in FIG. 14C, is defined by transverse walls 72a and 72c, and axial walls 72b and 72d extending between top surface 48 and bottom surface 148 of the carrier 30. A transverse slot 74 is formed through the carrier shell from top surface 48 to bottom surface 148 immediately adjacent transverse wall 72a. Referring to FIGS. 14A and 14B, the handle 300 includes a padded, self-supporting section 330 and a flexible strap 342 made from webbing material. The padded section 330 is semi-rigid as a result of an elongated strap stiffener 320, best seen in FIGS. 14F–14H. The strap stiffener 320 is formed from a strip of semi-rigid plastic material sewn or otherwise attached within the padded section 330. At one end 322 the strap stiffener 320 has a raised button 310 with a lip 312 formed around its top edge. The raised button 310 can be slotted to allow the lip 312 to flex inwardly when the button is pressed into an opening 40a through flange 40 at the head end 32 of the carrier, as best seen in FIG. 14D. The lip 312 retains the end 322 of strap stiffener 320 in a pivotal connection to flange 40. Although the pivotal connection between the handle 300 and flange 40 of the carrier 30 is shown in the preferred embodiment to be an integral button formed at the end of the strap stiffener, an artisan will recognize that the pivotal connection could be achieved by any of a number of well known methods such as rivets or other fasteners without departing from the spirit and scope of the invention.

Figure 14E:
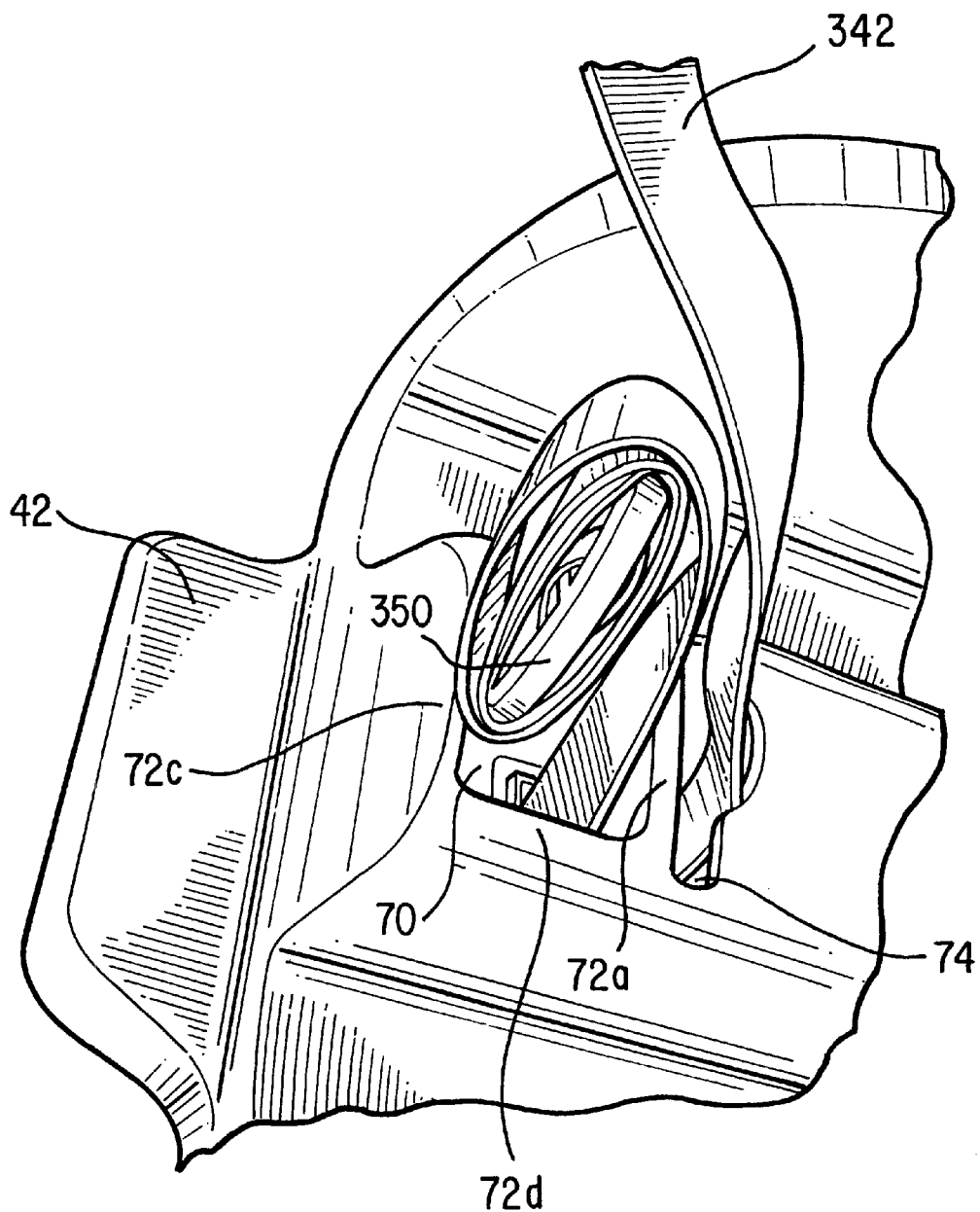
FIG. 14E is a perspective view of the adjusting feature at one end of the flexible strap according to the invention.
Figure 14H:
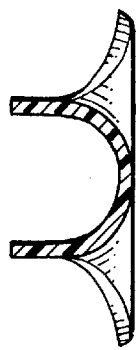
FIG. 14H is a sectional view taken along line 14H—14H in FIG. 14G.
Figure 14G:
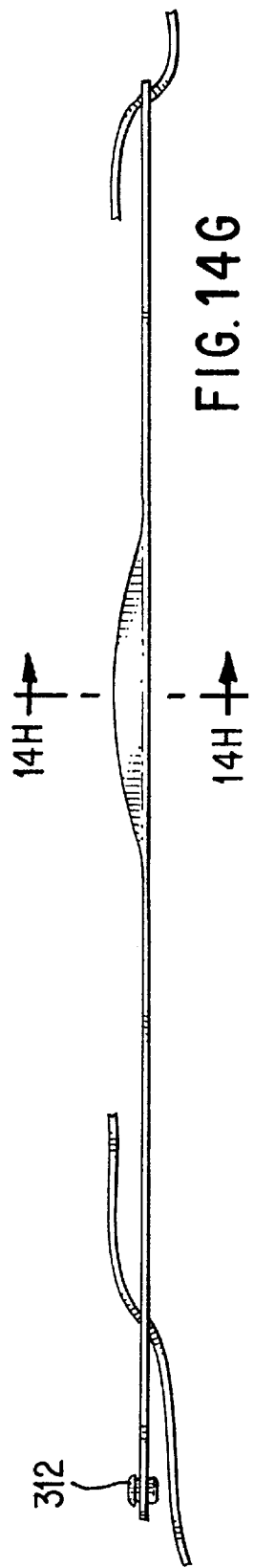
FIG. 14G is a side view of a strap stiffener removed from the adjustable handle according to an embodiment of the invention.
Figure 14F:
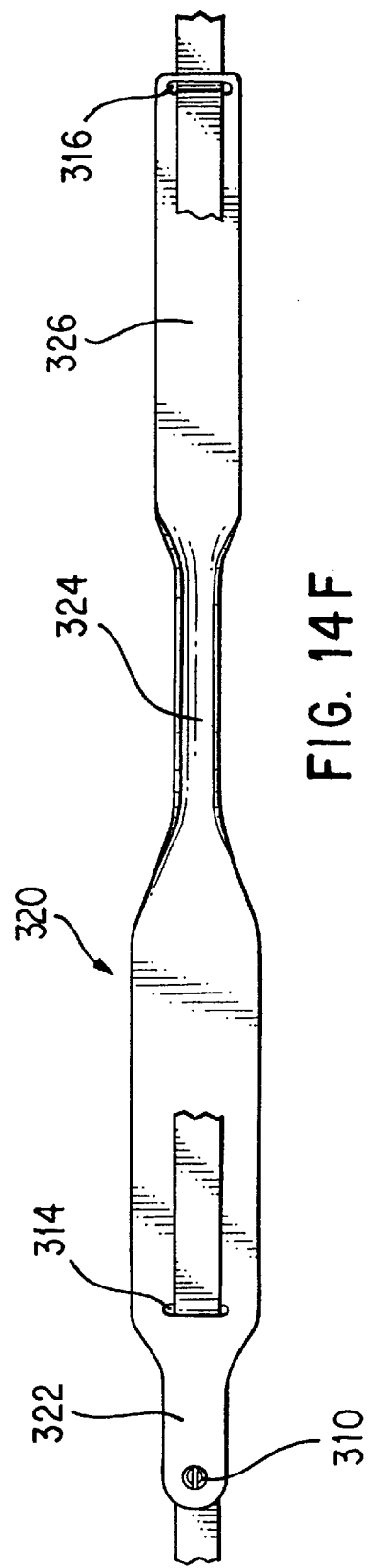
FIG. 14F is a plan view of a strap stiffener removed from the adjustable handle according to an embodiment of the invention.

A transverse slot 316 at end 326 of the strap stiffener 320 provides an opening through which the padded material 336 of padded section 330 can be sewn or otherwise attached to the stiffener 320. Flexible strap 342 can also be attached at one end to the padded section 330 at slot 316. The opposite end 344 of flexible strap 342 is attached to a strap anchor 350, best seen in FIG. 14A. Before attaching the end 344 of flexible strap 342 to the strap anchor 350, the end 344 is fed down through the transverse slot 74 at the foot end 34 of the carrier and up into the rectangular shaped cavity 70 on the opposite side of wall 72a from the slot 74. The strap anchor is substantially rectangular in shape with slots 354 and 356 formed on opposite sides of a central transverse section 352. The end 344 of strap 342 is passed through one of the strap anchor slots in one direction and back through the other slot to be wrapped around transverse section 352 and stitched to itself at end section 360. The substantially rectangular shape of the strap anchor 350 allows excess length of the flexible strap 342 to be conveniently wrapped around the strap anchor, as best seen in FIG. 14E, and the resulting substantially rectangular shaped bundle can be inserted into the substantially rectangular shaped cavity 70 in the carrier where it is prevented from unwrapping, thus providing a convenient and secure method of adjusting the length of flexible strap 342.

Longitudinal handle 300 can also be provided with a hook 340 attached at an intermediate point on the padded section 330. When it is desired to shorten the length of the handle 300 by an amount greater than can be achieved by simply wrapping excess length of the flexible strap 342 around the strap anchor 350, the flexible strap 342 can be pulled down through the slot 74 and up through rectangular cavity 70 at the foot end 34 of the carrier until the flexible strap 342 can be overlapped on the padded section 330 and the strap anchor can be attached to the padded section by clipping hook 340 through slot 356 in the strap anchor 350. As shown in FIG. 14A, a flap 332 of material can also be provided along the edge of the padded section 330 in the vicinity of the point of attachment for the strap anchor so that the flap 332 can be pulled over the end 344 of flexible strap 342 after the strap anchor 350 is attached at the hook 340 and fastened to the padded section 330 with any of a variety of well known methods including hook and loop type fasteners 334 such as those sold under the trademark "VELCRO", or snap fasteners, buttons etc.

Base Support

A separate base support 200 is provided to be fastened in position on a vehicle seat and left in position in the vehicle if desired when the infant carrier is removed for transporting the infant outside of the vehicle. The base support provides a sturdy structure for safely securing a rearwardly facing infant car seat in a vehicle. As best seen in FIG. 3A, the base support has a substantially vertical back portion 210 that will be positioned parallel to the back of a vehicle seat when the base support is secured to the vehicle seat using standard lap belts. A bottom section 212 has a substantially flat bottom surface 212b, seen in FIG. 4, for resting on the vehicle seat and a contoured top surface 212a for mating with the runners 160, 162 that protrude from the bottom of the infant carrier as described above and shown in FIG. 7.

The sides 206 and 207 of the base support are substantially triangular in shape and connect the bottom section 212 with the vertical back portion 210, with an opening 204 defined between the side walls 206, 207, the vertical back portion 210 and the bottom section 212. The opening 204 provides clearance for the foot end 34 of the carrier 30. The upturned protrusion 42 at the center of the foot end 34 of the carrier (described above) fits behind a downwardly extending protrusion 205 located at the center of the vertical back portion 210 when the infant carrier is installed on the base support, as best seen in FIG. 4. The downwardly extending protrusion 205 restrains vertical motion of the foot end 34 of the carrier as well as horizontal motion of the carrier toward the front of the vehicle.

The side rails 222, 224 at the top edges of sides 206, 207 are provided with troughs 222a and 224a, as best seen in FIG. 3A, to form seat belt pathways for the vehicle lap belt used to secure the base support to the vehicle. When infant carrier 30 is installed in base support 200, the vehicle lap belt passing over troughs 224a and 222a will pass underneath the bottom surface 148 of the carrier 30.

The forward end 202 of bottom section 212 is provided with laterally spaced, upstanding protrusions 214 and 216. Openings 214a and 216a are formed in the front sides of the upstanding protrusions for engagement with latch hooks 150, 154, described above. The top surfaces 214b and 216b of the protrusions 214 and 216 form camming surfaces that guide the tips of the latch hooks 150, 154. The latch hooks pivot about their respective mounts in the carrier shell as the carrier is pressed downwardly toward the bottom section 212 of base support 200 after protrusion 42 at the foot end of the carrier is placed through the opening 204 and engaged behind the protrusion 205 on the base support. As shown in FIG. 4 for latch hook 150, when the carrier is fully seated in the base support 200 with runners 160, 162 resting on top surface 212a of bottom section 212, the tips of latch hooks 150, 154 are biased toward the foot end of the carrier 30 by springs 170, 171 and are engaged in the openings 214a, 216a of protrusions 214, 216 to hold the carrier down against the base support.

Figure 3B:
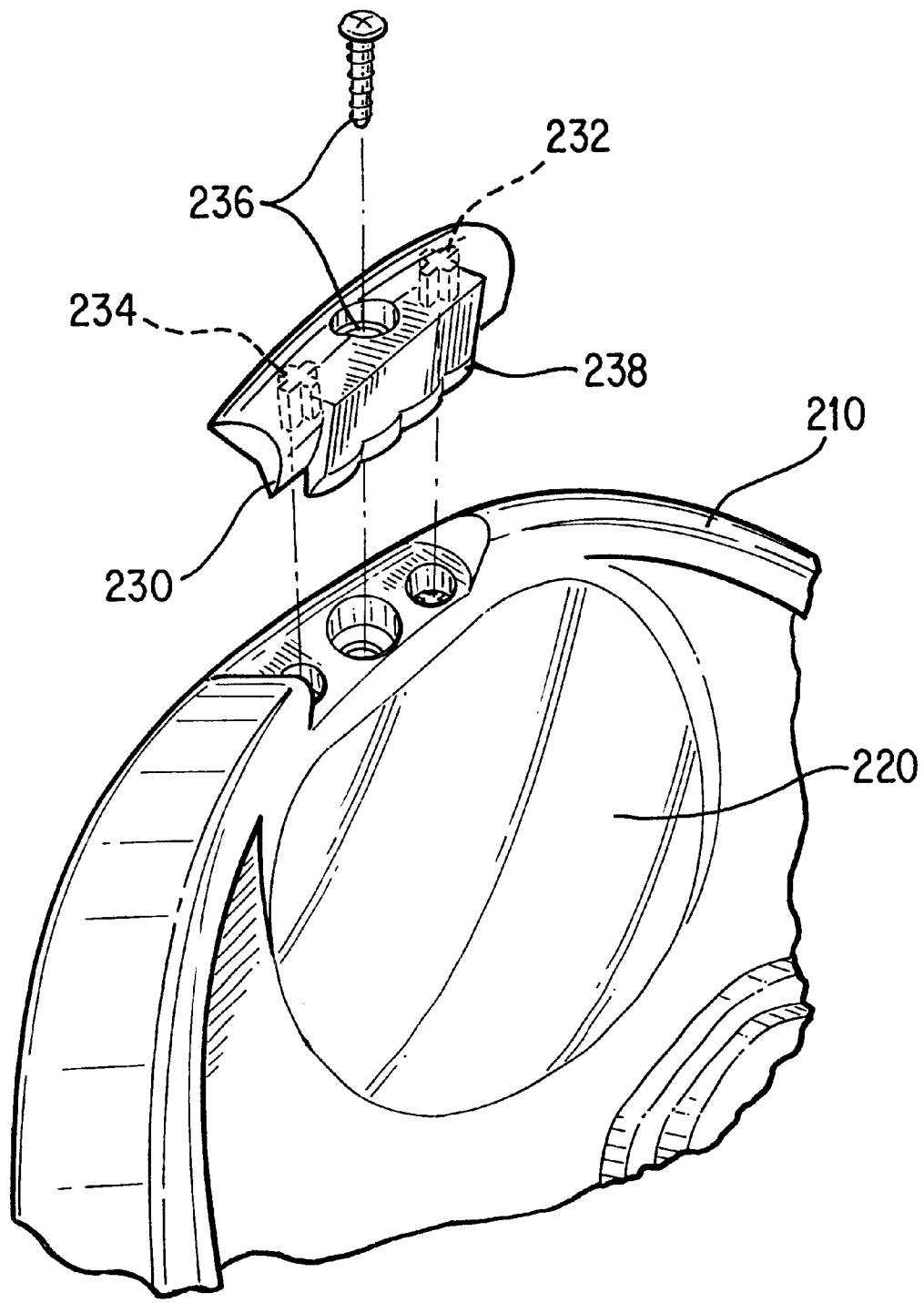
FIG. 3B is a detail view of the attachment of a mirror retainer to the base support.

The vertical back portion 210 of the base support 200 supports a mirror 220 in a high enough position relative to the carrier 30 mounted in the base support so that the mirror provides a view of the infant in the carrier that can be seen in the rear view mirror of the vehicle. As best seen in FIG. 3B, the mirror 220, which is preferably a convex mirror with a wide angle of view, is retained in the vertical back portion 210 by a mirror retainer 230. The mirror retainer can be attached to the vertical back portion 210 with dowel pins 232, 234 and a fastener 236, or by other methods well known to the artisan. A corrugated lip 238 can be provided on the mirror retainer 230 to overlap the top edge of the mirror 220, retaining the mirror in the base support and providing an esthetically pleasing arrangement.

What is claimed is:

1. A car seat for restraining an infant in a vehicle seat, comprising:
    a base support, said base support having a back portion and a carrier engagement portion including a first fastener; and
    an infant carrier including a second fastener, the infant carrier detachably mounted to said base support via cooperative mating of said first and second fasteners; said base support having a mirror mounted on said back portion in a position visible to a driver of the vehicle in a rear-view mirror when the infant carrier is mounted in the base support.

2. The car seat according to claim 1, wherein said back portion extends in a substantially vertical direction when said base support is secured to the vehicle seat using the vehicle's seat belt.

3. The car seat according to claim 2, wherein said carrier engagement portion includes an opening for receipt of a portion of one end of the infant carrier and a raised portion for engagement with a latch hook mounted on said infant carrier.

4. The car seat according to claim 3, wherein side portions of said base support define a seat belt pathway for positioning the vehicle's seat belt when the base support is secured to the vehicle seat using the vehicle's seat belt.

5. The car seat according to claim 4, wherein the seat belt passes underneath the infant carrier when the infant carrier is mounted to the base support and the base support is secured to the vehicle seat using the seat belt.

6. An infant seat, comprising:
    an infant carrier including a first fastener and a base support including a second fastener for mounting the infant carrier in a rear-facing direction when secured in a vehicle passenger seat via cooperative mating of said first and second fasteners;
    the base support including a substantially vertical back portion that extends substantially parallel to the back of the passenger seat when the base support is secured to the passenger seat; and
    the back portion supporting a mirror for viewing an infant seated in the infant carrier when the infant carrier is mounted on the base support.

7. The infant seat according to claim 6, wherein said cooperative mating comprises an interlocking mechanical connection.

8. The infant seat according to claim 7, wherein one of said first and second fasteners comprises a protrusion and the other comprises a recess.

9. The infant seat according to claim 6, wherein the base support includes an opening for receiving a portion of one end of the infant carrier, and a raised portion for engagement with a latch hook mounted on the infant carrier.

10. The infant seat according to claim 9, wherein the infant carrier includes first and second latch hooks spaced apart from each other and pivotally mounted on the infant carrier.

11. The infant seat according to claim 10, further including a handle slidably connected to said latch hooks such that said latch hooks can be pivoted about fixed points on said infant carrier and moved relative to said handle with said handle remaining stationary relative to said infant carrier, and said handle being mounted on said infant carrier for linear reciprocating motion relative to said infant carrier, wherein displacement of said handle away from said latch hooks causes said latch hooks to disengage from respective raised portions on said base support.

12. The infant seat according to claim 11, wherein said handle includes laterally spaced hook portions for engagement with attachment portions on a stroller when the infant carrier is removed from the base support and used as a stroller seat.

13. The infant seat according to claim 6, wherein said infant carrier includes an adjustable handle, and said adjustable handle comprises a self-supporting, flexible strap, said adjustable handle being pivotally connected to at least one of longitudinally opposed ends of the infant carrier, said strap being adjustable in length from a length sufficient to serve as a handle to be grasped by an adult's hand to a length sufficient to serve as a shoulder strap.

14. The infant seat according to claim 13, wherein the flexible strap can be shortened in length by folding a portion of said strap back over itself and securing the folded portion of the strap using a fastener.

15. An infant carrier handle in combination with an infant carrier, comprising:
    a substantially flexible strap pivotally connected at opposite ends to longitudinally opposed ends of the infant carrier;
    a first portion including a stiffener and a padded portion, said first portion of said strap being sufficiently rigid to be self-supporting, said first portion of said strap extending from one of said opposed ends of said infant carrier; and
    a second portion of said strap being soft and flexible, said second portion of said strap extending from the other of said opposed ends of said carrier.

16. The infant carrier handle in combination with the infant carrier according to claim 15, wherein said stiffener is disposed within said padded portion.

17. The infant carrier handle in combination with the infant carrier according to claim 16, wherein said stiffener comprises a strap stiffener.

18. The infant carrier handle according to claim 15, wherein the second portion of said strap terminates in a strap anchor and wherein excess length of said strap can be wrapped around said anchor to form a bundle adapted to be fitted in an opening in the infant carrier and prevented from being unwrapped as long as the anchor remains in the opening.

19. The infant carrier handle according to claim 18, wherein said strap is adjustable in length from a length sufficient to serve as a handle to be grasped by an adult's hand to a length sufficient to serve as a shoulder strap.

20. An infant seat, comprising:
   an infant carrier including a first fastener and a base support including a second fastener for mounting the infant carrier in a rear-facing direction when secured in a vehicle passenger seat via cooperative mating of said first and second fasteners;
   the base support including a substantially vertical back portion that extends substantially parallel to the back of the passenger seat when the base support is secured to the passenger seat; and
   the back portion supporting a mirror for viewing an infant seated in the infant carrier when the infant carrier is mounted on the base support.

21. The infant seat according to claim 20, wherein said cooperative mating comprises an interlocking mechanical connection.

22. The infant seat according to claim 21, wherein one of said first and second fasteners comprises a protrusion and the other comprises a recess.

23. The infant seat according to claim 20, further including an actuating mechanism mounted on said infant carrier for linear reciprocating motion in an axial direction of said infant carrier, said actuating mechanism actuating separate mechanisms for attachment of said infant carrier to said base support and for attachment of said infant carrier to a stroller.

24. The infant car seat according to claim 23, wherein the mechanism for attachment of said infant carrier to said base support comprises at least one latch hook pivotally mounted on said infant carrier.

25. The infant car seat according to claim 24, wherein the mechanism for attachment of said infant carrier to a stroller comprises at least one hook formed on said actuating mechanism.

26. The infant car seat according to claim 25, further including a flexible handle connected between longitudinally opposed ends of said infant carrier, said handle being adjustable in length and being pivotally connected to said infant carrier at one or both of said opposed ends.

27. The car seat according to claim 1, wherein said cooperative mating comprises an interlocking mechanical connection.

28. The car seat according to claim 27, wherein one of said first and second fasteners comprises a protrusion and the other comprises a recess.

\* \* \* \* \*

US006367875C1

(12) EX PARTE REEXAMINATION CERTIFICATE (9020th)
United States Patent
Bapst

(10) Number: US 6,367,875 C1
(45) Certificate Issued: May 22, 2012

(54) STAY IN VIEW CAR SEAT

(75) Inventor: David M. Bapst, South Wales, NY (US)

(73) Assignee: Mattel, Inc., El Segundo, CA (US)

Reexamination Request:
No. 90/009,919, Jun. 27, 2011

Reexamination Certificate for:
Patent No.: 6,367,875
Issued: Apr. 9, 2002
Appl. No.: 09/422,067
Filed: Oct. 21, 1999

(51) Int. Cl.
*B60N 02/28* (2006.01)
*A47D 01/10* (2006.01)

(52) U.S. Cl. .................. 297/250.1; 297/256.16; 297/183.1; 297/183.2; 297/185; 297/130; 297/217.6; 359/871

(58) Field of Classification Search .............. None
See application file for complete search history.

(56) References Cited

To view the complete listing of prior art documents cited during the proceeding for Reexamination Control Number 90/009,919, please refer to the USPTO's public Patent Application Information Retrieval (PAIR) system under the Display References tab.

*Primary Examiner* — Glenn K. Dawson

(57) ABSTRACT

An infant carrier is shown that can be used as a rearwardly facing infant car seat either by itself or attached to a separate base support, as a stroller seat, or as a carrier for an infant with an adjustable handle attached between longitudinally opposed ends of the carrier. The separate base support can be belted into a vehicle seat and left in place after the infant carrier is removed. The base support has a vertical portion that rests parallel to the back seat of the vehicle and includes a mirror mounted high enough on the back portion to be visible from the vehicle's rear view mirror when the infant carrier is mounted in the base support. The infant carrier has a handle that can be reciprocated in the axial direction of the carrier to actuate two separate attachment mechanisms for attaching the infant carrier to the base support or to a stroller.

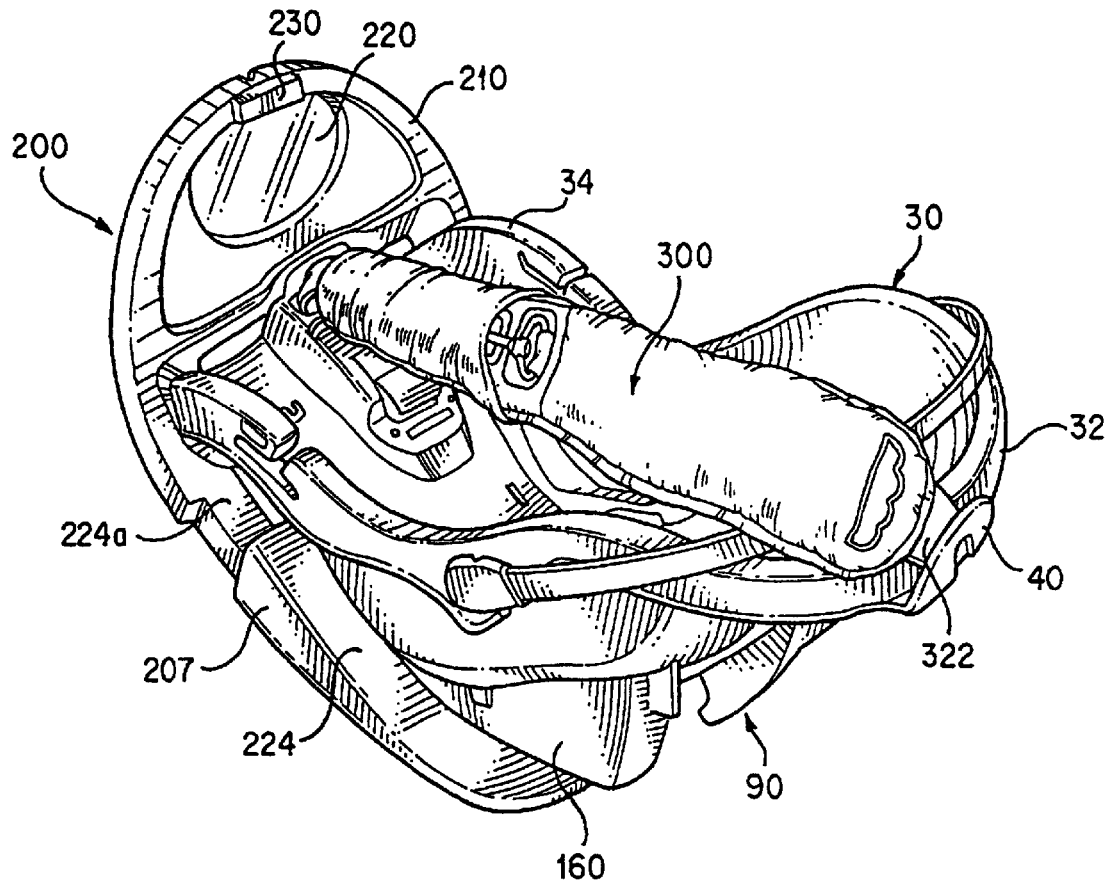

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-12 and 20-28 is confirmed.

New claims 29-48 are added and determined to be patentable.

Claims 13-19 were not reexamined.

29. The car seat according to claim 1, wherein:
said base support includes a bottom surface for resting on a vehicle seat and a top surface for mating with said infant carrier, said base support top surface being opposite said base support bottom surface; and
said first fastener is disposed along said base support top surface.
30. The car seat according to claim 29, wherein:
said base support further includes a side wall extending upward from said base support top surface and located proximate a base support perimeter; and
said first fastener is spaced from said side wall.
31. The car seat according to claim 30, wherein:
said side wall is a first side wall;
said base support further includes a second side wall extending upward from said base support top surface and located proximate said base support perimeter; and
said first fastener is spaced from said side walls.
32. The car seat according to claim 29, wherein:
said base support defines a perimeter; and
said first fastener is located inboard from said base support perimeter.
33. The car seat according to claim 1, wherein:
said infant carrier includes a top surface for supporting an infant and a bottom surface for mating with said base support, said carrier top surface being opposite said carrier bottom surface; and
said second fastener is disposed along said carrier bottom surface.
34. The car seat according to claim 33, wherein:
said infant carrier defines a perimeter; and
said second fastener is disposed inboard from said carrier perimeter.
35. The car seat according to claim 1, wherein said infant carrier includes:
a top surface that supports an infant and a bottom surface that engages said base support;
a release actuator in communication with said second fastener, said release actuator operable to disengage mated first and second fasteners; and
said release actuator is slidingly coupled to said carrier bottom surface.
36. The car seat according to claim 1, wherein:
said base support includes a bottom surface to contact a vehicle seat and top surface to contact said infant carrier;
said first fastener is disposed along said base support top surface;
said infant carrier includes a carrier top surface to support an infant and a carrier bottom surface to contact said base support; and
said second fastener is disposed along said carrier bottom surface.
37. The car seat according to claim 1, wherein:
said infant carrier defines a first carrier end and a second carrier end; and
said back portion of the said base support includes an opening disposed proximate the mirror, the opening receiving one of said ends of said infant carrier.
38. The car seat according to claim 1, wherein said first and second fasteners are configured such that said infant carrier mates to said base support in a single orientation.
39. The infant seat according to claim 6, wherein:
said base support includes a bottom surface that rests on a vehicle seat and a top surface that engages said infant carrier, said base support bottom surface being opposite said base support top surface; and
said second fastener is disposed along said base support top surface.
40. The infant seat according to claim 39, wherein:
said base support defines a perimeter; and
said second fastener is disposed inboard from said base support perimeter.
41. The infant seat according to claim 6, wherein:
said infant carrier includes a carrier top surface that supports an infant and a carrier bottom surface that engages said base support, said carrier top surface being opposite said carrier bottom surface;
said first fastener is disposed along said carrier bottom surface.
42. The infant seat according to claim 41, wherein:
said infant carrier defines a perimeter; and
said first fastener is disposed inboard from said carrier perimeter.
43. The infant seat according to claim 6, wherein:
said base support includes a bottom surface for resting on a vehicle seat and top surface for mating with said infant carrier, said base support bottom surface being opposite said base support top surface;
said base support defines a base support perimeter;
said second fastener is disposed inboard from said base support perimeter along said base support top surface;
said infant carrier includes a carrier top surface for supporting an infant and a carrier bottom surface for mating with said base support, said carrier top surface being opposite said carrier bottom surface;
said infant carrier defines a carrier perimeter; and
said first fastener is disposed inboard from said carrier perimeter along said carrier bottom surface.
44. The infant seat according to claim 20, wherein:
said base support includes a bottom surface that rests on a vehicle seat and a top surface that engages said infant carrier, said base support bottom surface being opposite said base support top surface; and said second fastener is disposed along said base support top surface.

45. The infant seat according to claim 44, wherein:

said base support defines a perimeter; and said second fastener is disposed inboard from said base support perimeter.

46. The infant seat according to claim 20, wherein:

said infant carrier includes a carrier top surface that supports an infant and a carrier bottom surface that engages said base support, said carrier top surface being opposite said carrier bottom surface;

said first fastener is disposed along said carrier bottom surface.

47. The infant seat according to claim 46, wherein:

said infant carrier defines a perimeter; and said first fastener is disposed inboard from said carrier perimeter.

48. The infant seat according to claim 20, wherein:

said base support includes a bottom surface for resting on a vehicle seat and top surface for mating with said infant carrier, said base support bottom surface being opposite said base support top surface;

said base support defines a base support perimeter;

said second fastener is disposed inboard from said base support perimeter along said base support top surface;

said infant carrier includes a carrier top surface for supporting an infant and a carrier bottom surface for mating with said base support, said carrier top surface being opposite said carrier bottom surface;

said infant carrier defines a carrier perimeter; and said first fastener is disposed inboard from said carrier perimeter along said carrier bottom surface.

\* \* \* \* \*